(12) United States Patent
Aikawa et al.

(10) Patent No.: US 7,848,136 B2
(45) Date of Patent: Dec. 7, 2010

(54) MAGNETIC MEMORY

(75) Inventors: Hisanori Aikawa, Kanagawa-Ken (JP);
Tomomasa Ueda, Kanagawa-Ken (JP);
Tatsuya Kishi, Kanagawa-Ken (JP);
Takeshi Kajiyama, Kanagawa-Ken (JP);
Yoshiaki Asao, Kanagawa-Ken (JP);
Hiroaki Yoda, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/100,969

(22) Filed: Apr. 10, 2008

(65) Prior Publication Data

US 2008/0204944 A1  Aug. 28, 2008

Related U.S. Application Data

(62) Division of application No. 11/000,093, filed on Dec. 1, 2004, now abandoned.

(30) Foreign Application Priority Data

Dec. 2, 2003  (JP) .............. 2003-402891
Aug. 25, 2004  (JP) .............. 2004-244771

(51) Int. Cl.
*G11C 11/15* (2006.01)
(52) U.S. Cl. .............. 365/158; 257/421; 257/E43.004
(58) Field of Classification Search .............. 365/158, 365/171–173; 216/22; 257/421–422, E43.001, 257/E43.004; 977/934–935; 438/3
See application file for complete search history.

(56) References Cited

U.S. PATENT DOCUMENTS

| 5,659,499 A | 8/1997 | Chen et al. |
| 5,757,695 A * | 5/1998 | Shi et al. ............ 365/158 |
| 5,956,267 A | 9/1999 | Hurst et al. |
| 6,005,800 A * | 12/1999 | Koch et al. ............ 365/173 |
| 6,104,633 A * | 8/2000 | Abraham et al. ............ 365/171 |

(Continued)

FOREIGN PATENT DOCUMENTS

JP  11-273337  10/1999

(Continued)

OTHER PUBLICATIONS

Frederikse, H.P.R. "Properties of Magnetic Materials." CRC Handbook, 89th Ed. (2009): Section 12, pp. 100-108.*

(Continued)

*Primary Examiner*—Matthew W Such
(74) *Attorney, Agent, or Firm*—Oblon, Spivak, McClelland, Maier & Neustadt, L.L.P.

(57) ABSTRACT

It is possible to reduce writing current without causing fluctuation of the writing characteristic. A magnetic memory includes: a magnetoresistance effect element having a magnetization pinned layer whose magnetization direction is pinned, a storage layer whose magnetization direction is changeable, and a non-magnetic layer provided between the magnetization pinned layer and the storage layer; and a first wiring layer which is electrically connected to the magnetoresistance effect element and extends in a direction substantially perpendicular to a direction of an easy magnetization axis of the storage layer, an end face of the magnetoresistance effect element substantially perpendicular to the direction of the easy magnetization axis of the storage layer and an end face of the first wiring layer substantially perpendicular to the direction of the easy magnetization axis being positioned on the same plane.

7 Claims, 24 Drawing Sheets

U.S. PATENT DOCUMENTS

| | | |
|---|---|---|
| 6,639,291 B1 | 10/2003 | Sin et al. |
| 6,747,301 B1 | 6/2004 | Hiner et al. |
| 6,785,160 B1 * | 8/2004 | Sharma et al. ............... 365/158 |
| 6,960,815 B2 | 11/2005 | Yoda et al. |
| 7,020,009 B2 | 3/2006 | Ho et al. |
| 7,132,707 B2 * | 11/2006 | Min et al. .................... 257/295 |
| 2001/0050859 A1 * | 12/2001 | Schwarzl .................... 365/158 |
| 2002/0140016 A1 | 10/2002 | Cha |
| 2002/0159203 A1 | 10/2002 | Saito et al. |
| 2003/0030944 A1 * | 2/2003 | Lin et al. ................. 360/324.1 |
| 2003/0062975 A1 | 4/2003 | Kishi et al. |
| 2003/0161181 A1 * | 8/2003 | Saito et al. .................. 365/173 |
| 2003/0168684 A1 * | 9/2003 | Pan et al. .................... 257/296 |
| 2003/0185050 A1 * | 10/2003 | Kishi et al. .................. 365/173 |
| 2003/0197984 A1 | 10/2003 | Inomata et al. |
| 2004/0057295 A1 * | 3/2004 | Matsukawa et al. ......... 365/200 |
| 2004/0065906 A1 | 4/2004 | Asao |
| 2004/0105326 A1 | 6/2004 | Matsuoka et al. |
| 2004/0141367 A1 * | 7/2004 | Amano et al. ............... 365/158 |
| 2004/0191928 A1 | 9/2004 | Shi |
| 2004/0256688 A1 * | 12/2004 | Braun ........................ 257/438 |
| 2005/0205909 A1 * | 9/2005 | Fukuzumi ................... 257/295 |

FOREIGN PATENT DOCUMENTS

| | | |
|---|---|---|
| JP | 2001-250206 | 9/2001 |
| JP | 2001-267522 | 9/2001 |
| JP | 2001-284550 | 10/2001 |
| JP | 2002-231904 | 8/2002 |
| JP | 2002-334973 | 11/2002 |
| JP | 2003-209226 | 7/2003 |
| WO | WO 02058166 A1 * | 7/2002 |

OTHER PUBLICATIONS

Soshin Chikazumi, "Physics of Ferromagnetic Materials (vol. 1)—Magnetism of Objects", Version 17, Mar. 25, 2000, 2 pages.

* cited by examiner

MAGNETIC MEMORY

CROSS-REFERENCE TO RELATED APPLICATION

This application is a divisional of and claims the benefit of priority from U.S. Ser. No. 11/000,093 filed on Dec. 1, 2004, and is based upon and claims the benefit of priority from prior Japanese Patent Application No. 2003-402891, and 2004-244771 filed on Dec. 2, 2003, and Aug. 25, 2004 in Japan, the entire contents of each of which are incorporated herein by reference.

FIELD OF THE INVENTION

The present invention relates to a magnetic memory having a magnetoresistance effect element in a memory cell.

RELATED ART

A magnetic random access memory (MRAM) is a memory device which uses a magnetoresistance effect element in a cell portion which stores information or data, to which attention is paid as the next generation memory device characterized by high speed operation, mass storage, and nonvolatile. The magnetoresistance effect is a phenomenon where when magnetic field is applied to a ferromagnetic material, an electric resistance varies according to direction of magnetization of the ferromagnetic material. Function serving as a memory device (MRAM) can be achieved by using the direction of magnetization of such ferromagnetic material for recording information or data to read the information according to the magnitude of an electric resistance corresponding to the direction of magnetization. In recent years, in a ferromagnetic tunnel junction including a sandwich structure where an insulating layer (a tunnel barrier layer) is interposed between two ferromagnetic layers, taking advantage of such a fact that a magnetoresistance change ratio (MR ratio) of 20% or more can be obtained owing to a tunnel magnetoresistance effect (TMR effect), an MRAM where a ferromagnetic tunnel junction magnetoresistance effect element (TMR element) utilizing a tunnel magnetic effect is used is expected and attractive.

When the TMR element is used in the MRAM, one of the two ferromagnetic layers sandwiching the tunnel barrier layer is constituted as a magnetization pinned layer with direction of magnetization pinned so as not to vary, which is a reference layer, while the other ferromagnetic layer is constituted as a magnetization free layer with direction of magnetization easily reversed, which is a storage layer. Information or data can be stored by causing a parallel state where the directions of magnetization in the reference layer and in the storage layer are parallel to each other and an anti-parallel state where the both are anti-parallel to correspond to "0" and "1" of binary information. Writing of record information is performed by causing current to flow a writing wire provided near the TMR element to generate induced magnetic field and reversing the direction of magnetization in the storage layer by the induced magnetic field. Reading of record information is performed by detecting an amount of magnetoresistance change due to the TMR effect. Accordingly, it is preferable that the magnetoresistance change ratio (MR ratio) due to the TMR effect is larger and field required for magnetization reversing, namely, switching magnetic field is smaller in the storage layer. On the other hand, it is necessary to pin magnetization of the reference layer such that reversing of the magnetization hardly occurs. For this reason, such a method that an anti-ferromagnetic layer is provided so as to come in contact with the ferromagnetic layer so that magnetization reversing is made hard to occur due to an exchange coupling force is used. Such a structure is called "spin valve structure". In this structure, the direction of magnetization in the reference layer is determined by conducting thermal treatment during application of magnetic field. (magnetization pinning anneal).

As described above, the MRAM conducts magnetization reversing on the storage layer utilizing induced magnetic field generated by current flowing in a writing wire. However, magnetic field required for magnetization reversing, namely switching magnetic field becomes large according to fineness of the TMR element, which results in increase in amount of current flowing in the writing wire and, therefore, increase in power consumption. In order to solve the problem, a so-called "a wire with a yoke" constituted by covering a writing wire with soft magnetic material or the like to cause magnetic field generated from the writing wire to act on the TMR element efficiently (for example, refer to U.S. Pat. No. 5,659,499 and U.S. Pat. No. 5,956,267).

Even if such a wire with a yoke is provided, magnetic field is actually concentrated on an end portion of the soft magnetic layer on the wire with a yoke. Therefore, in order to reduce writing current, such a constitution can be employed that the end portion of the soft magnetic layer on the wire with a yoke is positioned near the TMR element.

However, it is difficult to manufacture an MRAM where a relative position between the end portion of the soft magnetic layer and the TMR element has been determined considering not only a deviation between the end portion of the soft magnetic layer and the TMR layer on a plane but also a deviation therebetween in a vertical direction which is a direction perpendicular to the plane. Further, a deviation in difference between the end portion of the soft magnetic layer and the TMR element appears as a difference in writing characteristic of the TMR element as it is, which causes some fluctuation in writing characteristic.

SUMMARY OF THE INVENTION

The present invention has been made in view of the above circumstances, and an object thereof is to provide a magnetic memory which decreases fluctuation in writing characteristic and allows reduction of writing current.

Further, another object thereof is to provide a magnetic memory which allow mass storage and high speed writing.

A magnetic memory according a first aspect of the present invention includes: a magnetoresistance effect element having a magnetization pinned layer whose magnetization direction is pinned, a storage layer whose magnetization direction is changeable, and a non-magnetic layer provided between the magnetization pinned layer and the storage layer; and a first wiring layer which is electrically connected to the magnetoresistance effect element and extends in a direction substantially perpendicular to a direction of an easy magnetization axis of the storage layer, an end face of the magnetoresistance effect element substantially perpendicular to the direction of the easy magnetization axis of the storage layer and an end face of the first wiring layer substantially perpendicular to the direction of the easy magnetization axis being positioned on the same plane.

A magnetic memory according to a second aspect of the present invention includes: a magnetoresistance effect element which has a magnetization pinned layer whose magnetization direction is pinned, a storage layer whose magnetization direction is changeable, and a non-magnetic layer provided between the magnetization pinned layer and the storage layer, and whose film face shape has a long axis and a short axis; and a first wiring layer which is electrically connected to the magnetoresistance effect element, an end face of the magnetoresistance effect element extending along the short axis of the magnetoresistance effect element and a side face of the first wiring layer extending along a longitudinal direction of the first wiring layer being positioned on the same plane.

A method for manufacturing a magnetic memory according to a third aspect of the present invention includes: stacking a magnetoresistance effect film which serves as a magnetoresistance effect element and comprises a first magnetic layer serving as a magnetization pinned layer whose magnetization direction is pinned, a second magnetic layer serving as a storage layer whose magnetization direction is changeable, and a non-magnetic layer provided between the first magnetic layer and the second magnetic layer to serve as a tunnel barrier layer, and a wiring film serving as a wire; and patterning the magnetoresistance effect film and the wiring film such that an end face of the magnetoresistance effect element substantially perpendicular to a direction of an easy magnetization axis of the storage layer and an end face of the wiring film substantially perpendicular to the direction of the easy magnetization axis are positioned on the same plane.

A method for manufacturing a magnetic memory according to a fourth aspect of the present invention includes: stacking a magnetoresistance effect film which serves as a magnetoresistance effect element and comprises a first magnetic layer serving as a magnetization pinned layer whose magnetization direction is pinned, a second magnetic layer serving as a storage layer whose magnetization direction is changeable, and a non-magnetic layer provided between the first magnetic layer and the second magnetic layer to serve as a tunnel barrier layer and whose film face shape has a long axis and a short axis, and a wiring film serving as a wire; and patterning the magnetoresistance effect film and the wiring film such that an end face of the magnetoresistance effect element extending along the short axis of the magnetoresistance effect element and a side face of the wiring layer extending along a longitudinal axis of the wire are positioned on the same plane.

A magnetic memory according to a fifth aspect of the present invention, which has memory cells, each includes: a storage element having a magnetic recording layer whose magnetization direction changes according to external magnetic field, a magnetization pinned layer whose magnetization direction is pinned, and a non-magnetic layer provided between the magnetic recording layer and the magnetization pinned layer; a writing wire which is provided on the opposite side of the magnetic recording layer from the non-magnetic layer and in which writing current flows; and a yoke which is provided on the opposite side of the writing wire from the magnetic recording layer, a pair of opposed side faces of the storage element being positioned on the same plane as a pair of opposed side faces of each of the writing wire and the yoke, and a relative magnetic permeability of the magnetic recording layer being 5 or more.

A magnetic memory according a sixth aspect of the present invention, which has memory cells, each includes: a storage element having a magnetic recording layer whose magnetization changes according to external magnetic field, a magnetization pinned layer whose magnetization direction is pinned, and a non-magnetic layer provided between the magnetic recording layer and the magnetization pinned layer; a writing wire which is provided on the opposite side of the magnetic recording layer from the non-magnetic layer and in which writing current flows; and a yoke which is provided on the opposite side of the writing wire from the magnetic recording layer, a longitudinal axis of the magnetic recording layer being inclined to a direction perpendicular to a direction in which the writing wire extends by an angle of more than 0° and less than 90°, and a relative magnetic permeability of the magnetic recording layer being 5 or more.

A magnetic memory according to a seventh aspect of the present invention, which has memory cells, each includes: a storage element having a magnetic recording layer whose magnetization direction changes according to external magnetic field, a magnetization pinned layer whose magnetization direction is pinned, and a non-magnetic layer provided between the magnetic recording layer and the magnetization pinned layer; a writing wire which is provided on the opposite side of the magnetic recording layer from the non-magnetic layer and in which writing current flows; and a yoke which is provided on the opposite side of the writing wire from the magnetic recording layer, a longitudinal axis of the magnetic recording layer being inclined to a direction perpendicular to a direction which the writing wire extends by an angle of more than 0° and less than 90°, and a pair of opposed side faces of the storage element being positioned on the same plane as a pair of opposed side faces of each of the writing wire and the yoke.

DETAILED DESCRIPTION OF THE INVENTION

Embodiments of the present invention will be explained below with reference to the drawings.

First Embodiment

Figure 1A:
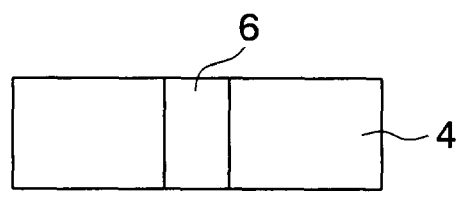
FIGS. 1A and 1B are a plan view and a front view showing a constitution of a memory cell in a magnetic memory according to a first embodiment of the present invention.
Figure 1B:
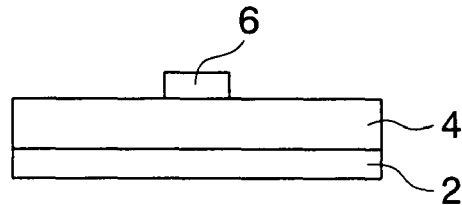
Figure 2:
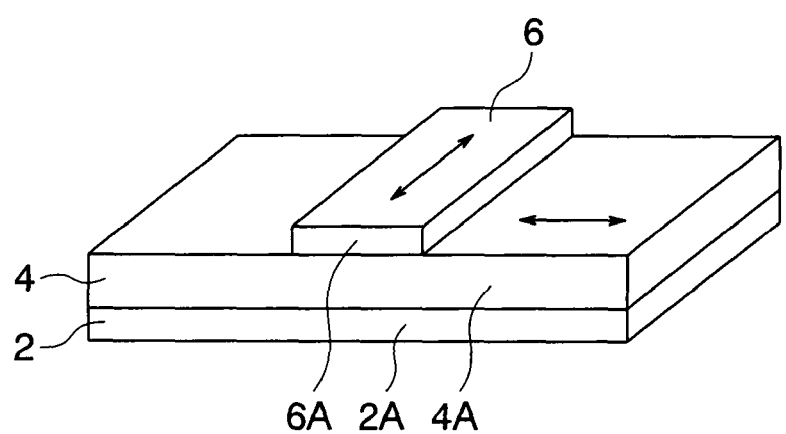
FIG. 2 is a schematic perspective view showing a constitution of the memory cell in the magnetic memory according to the first embodiment.

A magnetic memory according to a first embodiment of the present invention will be explained with reference to FIG. 1A to FIG. 11. A magnetic memory according to this embodiment has a plurality of memory cells arranged in a matrix array. A constitution of each memory cell is schematically shown in FIGS. 1A and 1B. FIGS. 1A and 1B are a plan view and a front view of a memory cell according to the embodiment, respectively. FIG. 2 is a perspective view of the memory cell according to the embodiment. The memory cell according to the embodiment is provided with a TMR element 6, a writing wire 4 for performing writing on the TMR element 6, and a yoke 2 formed of a magnetic layer. The writing wire 4 is formed on the yoke 2, and the TMR element 6 is formed on the writing wire 4. Incidentally, a wire (not shown) used for reading is provided on the TMR element 6.

Figure 3:
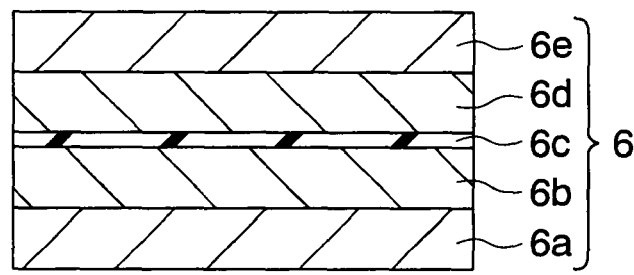
FIG. 3 is a schematic sectional view showing a constitution of a TMR element used in the present invention.

As shown in FIG. 3, for example, the TMR element 6 has a stacking structure of a lower electrode layer 6a, a magnetization free layer 6b constituting a storage layer with variable direction of magnetization, a tunnel barrier layer 6c, a magnetization pinned layer 6d constituting a reference layer with pinned direction of magnetization, and an upper electrode layer 6e. Incidentally, in order to fix the magnetization pinned layer 6d by an exchange coupling force, it is preferable that an anti-ferromagnetic layer (not shown) is provided between the upper magnetic electrode layer 6e and the magnetization pinned layer 6d. In this embodiment, the magnetization free layer 6b is formed below the magnetization pinned layer 6d via the tunnel barrier layer 6c, but it may be formed above the magnetization pinned layer 6d via the tunnel barrier layer 6c. The direction of the magnetization pinned layer 6d and the direction of magnetization free layer 6b are parallel or anti-parallel, but the directions of magnetization of the both correspond to a direction of an easy magnetization axis. The direction of the easy magnetization axis of the magnetization pinned layer 6d and the magnetization free layer 6b, namely, a direction of an easy magnetization axis of the TMR element 6 is indicated with arrow in FIG. 2.

On the other hand, a direction of an easy magnetization axis of the yoke 2 corresponds to a longitudinal direction thereof and it is perpendicular to the direction of the easy magnetization axis of the TMR element 6, as shown in FIG. 2.

In the embodiment, as shown in FIGS. 1A and 2, such a constitution is employed that an end face 6A of the TMR element 6 perpendicular to the easy magnetization axis thereof, and end faces 4A and 2A of the writing wire 4 and the yoke 2 which are parallel to the longitudinal directions of the writing wire 4 and the yoke 2 and are perpendicular to their easy magnetization axes are positioned substantially on the same plane.

In the embodiment, induced magnetic field generated from the writing wire 4 is concentrated on the end face 4A of the writing wire 4, and the end face 4A of the writing wire 4 and the end face 6A perpendicular to the easy magnetization axis of the TMR element 6 are positioned substantially on the same plane. For this reason, regarding a plurality of memory cells, a relative positional deviation in a plane direction between the writing wire 4 and the TMR element 6 is not present principally. Since a distance fluctuation in a direction of film thickness between the end face 4A of the writing wire 4 and the storage layer 6B of the TMR element 6 depends on only the film thickness of the stacked layer present therebetween, such a fluctuation can be reduced by selecting a proper film forming process. In a recent sputtering apparatus for TMR element production, it is a common practice to guarantee a film thickness distribution within a plane of an 8-inch substrate in ±1% or less. Accordingly, writing characteristic on a plurality of memory cells can be prevented from fluctuating.

Figure 4:
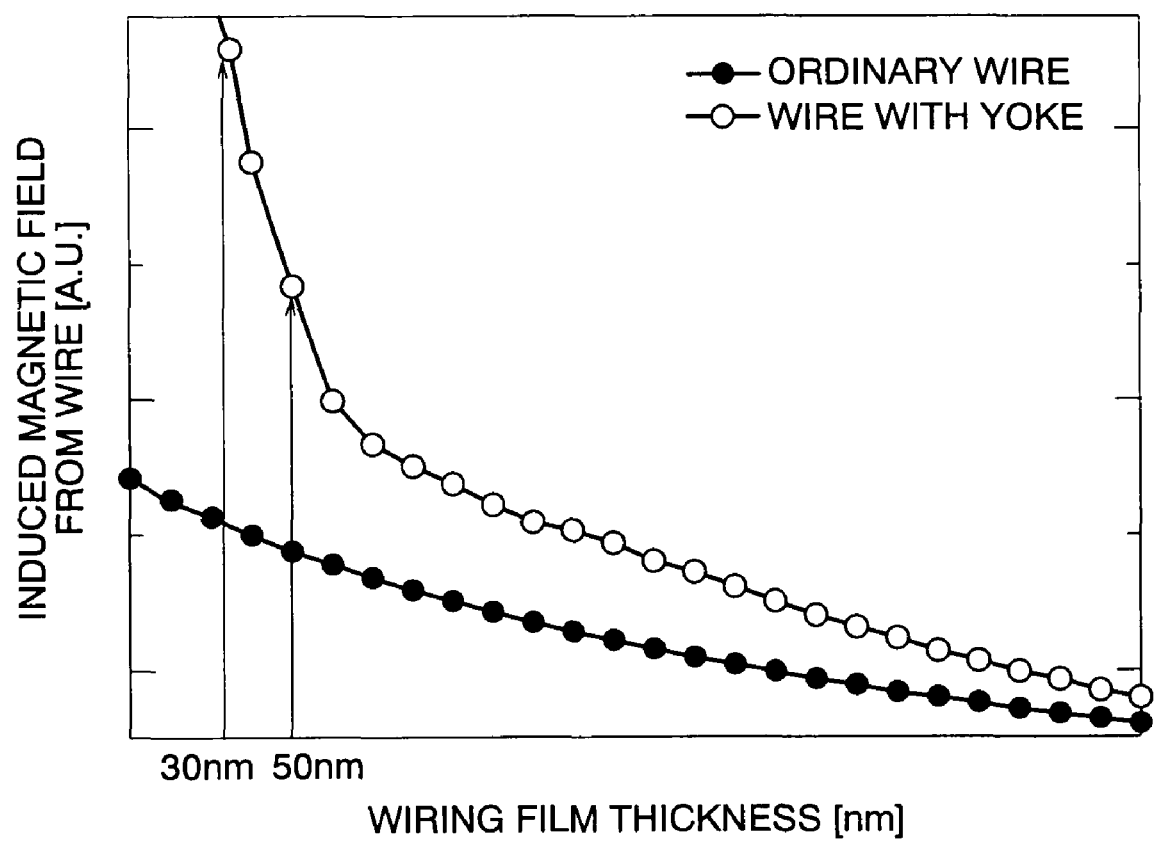
FIG. 4 is a graph showing a relationship between a film thickness on a wire and induced magnetic field generated from the wire.

FIG. 4 is a characteristic graph showing a wiring film thickness dependency of induced magnetic field generated at a central portion of the TMR element 6 from the writing wire 4 when a writing current is maintained at a fixed value. Regarding the thickness of the wiring layer 4, as understood from FIG. 4, when thickness sizes of both a wire with no yoke and a wire with a yoke are reduced down to 50 nm or so, induced magnetic fields in the both become large.

It has been found that, when a wire with a yoke is employed, a current value at which magnetization of the storage layer 6b in the TMR element 6 is actually reversed is deviated from the graph according to thinning of the wire film thickness. Such a phenomenon is not elucidated sufficiently at present, but the following two reasons may be considered as the cause thereof.

(a) Since the magnetic layer 4 of the wire with a yoke and the storage layer in the TMR 6 are close to each other, when the magnitude of the induced magnetic field applied to only the end of the TMR element 6 exceeds the magnitude of the switching field, the magnetization is wholly reversed at a stroke.

(b) A magnetic resistance of the yoke 2, the TMR element 6, and a magnetic circuit formed of the yoke 2 becomes small, so that magnetic flux larger than that obtained when it is assumed that the TMR element is a complete non-magnetic layer is generated.

In the magnetic memory according to the embodiment, the above effect or advantage was noticeable when the wiring layer film thickness is experimentally set to 50 nm or less. However, it is preferable for achieving a sufficient effect or advantage that the film thickness is set to 30 nm or less.

In the magnetic memory according to the embodiment, since the easy magnetization axis of the yoke 2 and the easy magnetization axis of the TMR element 6 are perpendicular to each other, any magnetic interaction between the both is not present in a state where current does not flow in the wire. Therefore, magnetic disturbance due to the yoke 2 to the TMR element 6 is not generated.

The magnetic memory according to the embodiment is suitable for fineness. This is because a lower electrode larger than the TMR element 6 is used in an ordinary MRAM structure, and a cell size in an MRAM generally depends on the size of the lower electrode. In the embodiment, since the lower wire serves as the lower electrode 6a too, the cell size can be reduced.

The TMR element 6 is a tunnel junction type magnetoresistance element including at least one magnetization pinned layer, at least one magnetization free layer (a storage layer), and a tunnel barrier layer sandwiched between the magnetization pinned layer and the magnetization free layer, and it is unnecessary to specify the order of stacking of the storage layer and the magnetization pinned layer.

General material with high magnetic permeability, such as soft ferrite including Fe, Fe—Al alloy, Fe—Si alloy, or such Fe—Si—Al alloy as Sendust as a main ingredient, or amorphous alloy of Fe, Co, Ni and B, Si, P, or the like is suitable as magnetic material used for the yoke 2. It is preferable that the magnetic material has relative magnetic permeability of 10 or more, and it is important to meet the following expression in order to perform writing on the TMR element. Magnetic permeability of the yoke 2×the film thickness of the yoke 2>the magnetic permeability of the magnetization free layer 6b×the film thickness of the magnetization free layer 6b.

As described above, according to this embodiment, writing current can be reduced without fluctuation in writing characteristic.

Figure 5:
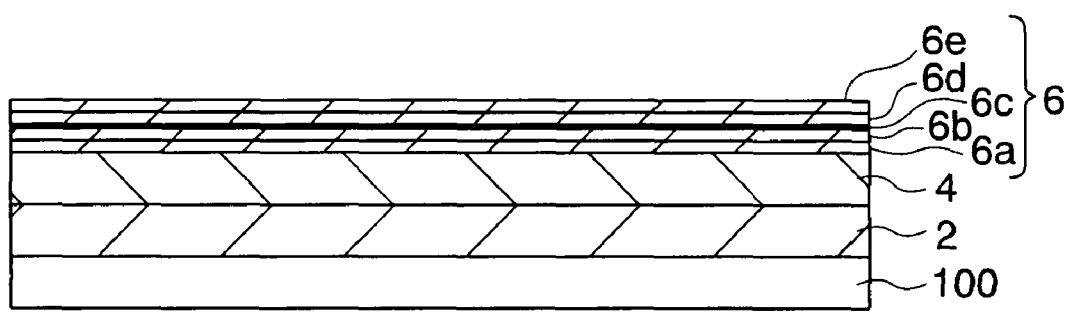
FIG. 5 is a sectional view showing a step of manufacturing the magnetic memory according to the first embodiment.

Next, a method for manufacturing the magnetic memory according to the first embodiment will be explained with reference to FIG. 5 to FIG. 10. As shown in FIG. 5, first, a driving circuit for an MRAM and the like are formed on a lower layer, and a yoke 2 with a film thickness of 10 nm made of Ni—Fe and a writing wiring layer 4 with a film thickness of 20 nm made of Cu are sequentially deposited on a substrate 100 covered with an insulating film. A stacked layers film constituting the TMR element 6 is deposited using sputtering. Here, it is desirable that the yoke 2 is deposited under external magnetic field environment in order to arrange an easy magnetization axis in a direction of a long side of the writing wiring layer 4.

On the other hand, it is desirable that the magnetization free layer 6b of the TMR element 6 is deposited under external magnetic field environment such that the easy magnetization axis of the magnetization free layer 6b is coincident with a direction substantially perpendicular to the yoke 2, namely, a direction of a longitudinal axis of the TMR element 6. Accordingly, when all the layers of the yoke 2 to the upper electrode layer 6e are deposited in bundle in the same apparatus, it is desirable that an apparatus which allows a direction of external magnetic field to rotate at least 900 is selected. In this embodiment, the magnetization fixing anneal is performed before this process starts in order to relax stress of the stacked layers film, but it may be performed after the process, or before and after the process.

In the TMR element 6 according to the embodiment, Ta serving as the lower electrode layer 6a, Co—Fe—Ni serving as the magnetization free layer 6b, $Al_2O_3$ obtained by plasma-oxidizing Al serving as the tunnel barrier layer 6c, Co—Fe serving as the magnetization pinned layer 6d, Ir—Mn serving as the anti-ferromagnetic layer (not shown) for fixing magnetization of the magnetization pinned layer 6d, and Ta serving as the upper electrode layer 6e are sequentially stacked (refer to FIG. 5).

Figure 6:
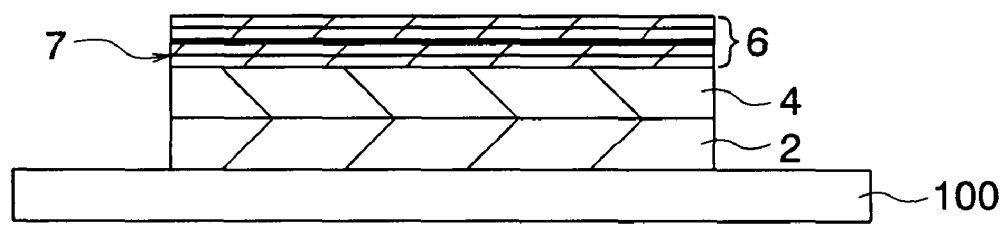
FIG. 6 is a sectional view showing a step of manufacturing the magnetic memory according to the first embodiment.

Next, as shown in FIG. 6, the stacked layers of the upper electrode layer 6e to the yoke 2 are etched using lithography technique such that the wiring layer 4 is formed in a predetermined shape. In the embodiment, an RIE (Reactive Ion Etching) apparatus where argon gas is mainly introduced is used for etching process, but an ion milling apparatus may be used instead thereof. An end face indicated with reference numeral 7 in FIG. 6 is a long side of the wiring layer (wire) 4 and corresponds to a short side of the TMR element 6. The TMR element 6 is an element including the upper and lower ferromagnetic layers 6b and 6d separated from each other by an extremely thin tunnel barrier layer 6c, where it is important for improvement in process yield that the upper layer and the lower layer are not short-circuited during etching process. The inventors have tried various etching work processes and have found that a main factor of short-circuiting is re-adhesion of material or metal which has been removed by the etching process to the vicinity of the tunnel barrier layer 6c. In the embodiment, the yoke 2 which is a lower layer is removed by etching, and thereafter metal which has been re-adhered to a side wall at a short side of the TMR element 6 is removed while an insulating layer (not shown) which is a further lower layer is subsequently being etched, so that process yield is improved.

Figure 7:
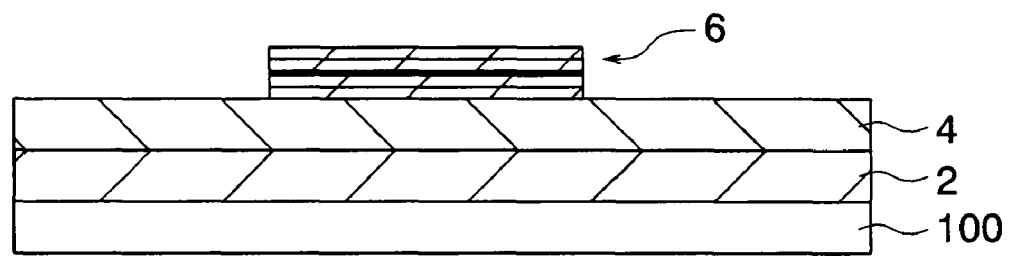
FIG. 7 is a sectional view showing a step of manufacturing the magnetic memory according to the first embodiment.

As shown in FIG. 7, processing is conducted by performing etching for defining a long side edge of the TMR element 6. A section shown in FIG. 7 is a section extending in a direction perpendicular to sections shown in FIGS. 5 and 6. Since an etching mask may define only a long side of the TMR element 6 using photolithography, it is important to use a mask where a long side position of the TMR element 6 is coincident with the TMR element 6 and a short side position thereof exceeds the TMR element 6. In this embodiment, a mask with a shape perpendicular to the wiring layer 4, which is obtained by connecting long sides of a plurality of TMR elements 6 is used. Etching may be performed from the upper electrode layer 6e to the magnetization free layer 6b, but cutting-in may be conducted to such an extent that the resistivity of the wiring layer 4 does not cause a problem about an electric circuit. In this embodiment, it is known that a short-circuiting failure rate on the TMR element 6 increases according increase in an amount of cutting-in exceeding the magnetization free layer 6b. Therefore, it is important for yield improvement to stop etching just after etching down to the magnetization free layer 6b is completed.

Figure 8:
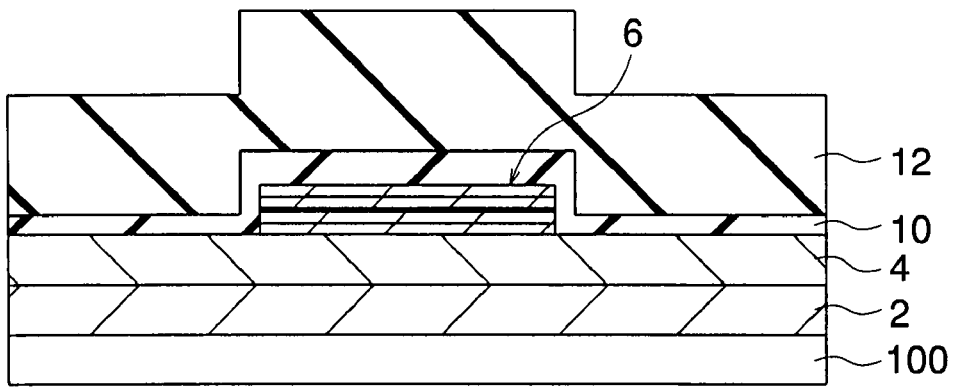
FIG. 8 is a sectional view showing a step of manufacturing the magnetic memory according to the first embodiment.

The TMR element 6 having the writing wiring layer 4 is completed by the above process. Thereafter, as shown in FIG. 8, after an insulating film 10 with a thickness of 30 nm made of Al2O3 is deposited by using sputtering, TEOS (tetraethoxy-ortho-silicate) is plasma-decomposed to deposit an insulating film 12 with a thickness of 100 nm made of SiO2 to using a PECVD (plasma-enhanced chemical vapor deposition) process.

Figure 9:
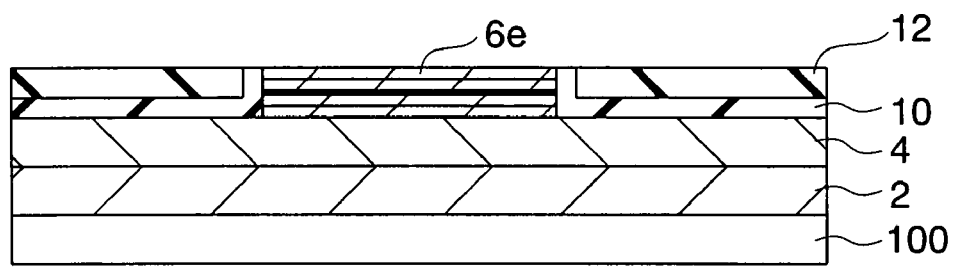
FIG. 9 is a sectional view showing a step of manufacturing the magnetic memory according to the first embodiment.

Then, after material for planarization, such as planarizing resist is applied to obtain electric connection with the TMR element 6, the upper electrode layer 6e is exposed using a technique for a whole face etch back conducted by RIE, CMP (Chemical Mechanical Polishing) or the like (refer to FIG. 9). Of course, such a constitution may be employed that openings are formed in the insulating film 12 made of $SiO_2$ and the insulating film 10 made of $Al_2O_3$ so that the upper electrode 6e is exposed.

Figure 10:
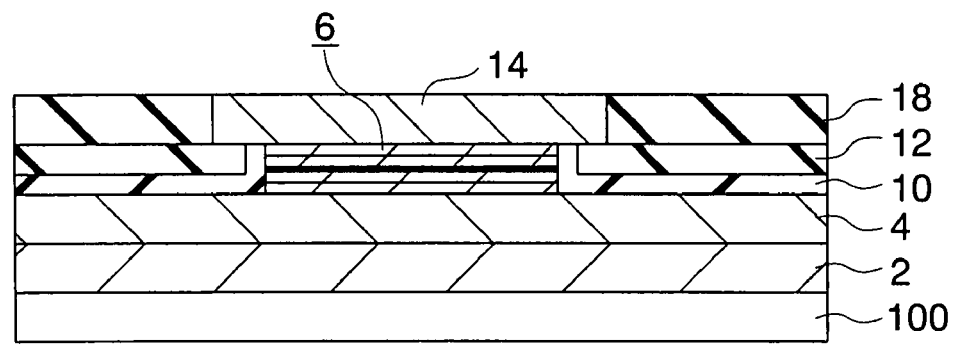
FIG. 10 is a sectional view showing a step of manufacturing the magnetic memory according to the first embodiment.

After an opening (not shown) for achieving electric connection with the MRAM driving circuit positioned further below is further formed, a wiring layer 14 with a three-layered structure of a Ti layer with a film thickness of 30 nm, an Al layer with a film thickness of 300 nm, and a Ti layer with a film thickness of 30 nm is deposited using sputtering process and the wiring layer 14 is patterned in a predetermined shape using lithography technique to be completed (refer to FIG. 10). The wiring layer (wire) 14 may be patterned in any direction, but it is desirable for further reducing a possibility of erroneous writing at a reading time that the wiring layer 14 is patterned in parallel with a mask pattern for processing the TMR element 6. Thereafter, an insulating layer 18 made of SiN or the like is generally deposited on a required portion after the wire 14 is patterned in order to improve reliability.

Figure 11:
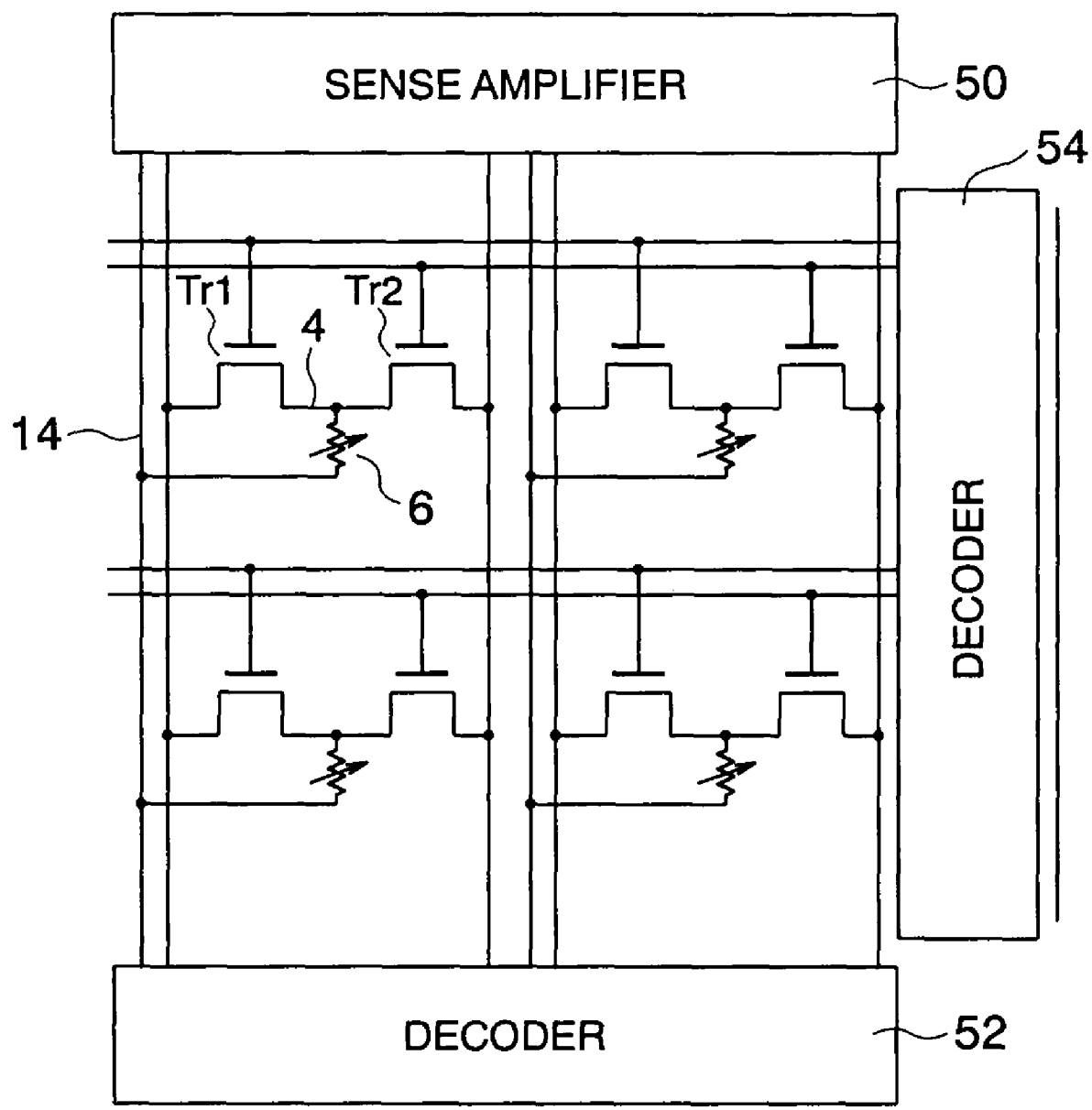
FIG. 11 is an electric circuit diagram showing a constitution of the magnetic memory according to the first embodiment.

FIG. 11 is a circuit diagram showing one specific example of an electric circuit of the magnetic memory according to the first embodiment of the present invention. The magnetic memory of the embodiment is provided with a plurality of memory cells, a sense amplifier 50, and decoders 52, 54. Each memory cell has one TMR element 6, a writing wire 4 corresponding to the TMR element 6, and two transistors Tr1, Tr2 for writing selection corresponding to the writing wire 4. Memory cell selections at a writing-in time and at a reading-out time are conducted by the decoder 52 and the decoder 54. At the writing time, writing is performed by turning on two transistors Tr1, Tr2 in the selected memory cell by the decoder 54 and performing floating of the wire 14 by the decoder 52 and the sense amplifier 50. At the reading time, a resistance of the TMR element is read out by turning off the transistor Tr1 in the selected memory cell and turning on the transistor Tr2 therein by the decoder 54 to detect current flowing in the wire 14, the TMR element 6, and the transistor Tr2 by the sense amplifier 50. Since the wire 4 acts on only the TMR element 6 corresponding thereto at the writing-in time, erroneous writing-in on the other TMR elements 6 is principally prevented from occurring. In fact, no erroneous writing-in was found in the embodiment.

Unless the structures of the wire 4 and TMR elements 6 deviate from the present invention, a design for a memory circuit can be modified freely regardless of the embodiment. For example, modification to a reading circuit with a higher reliability can be made by increasing the number of transistors to be used.

Second Embodiment

Figure 12:
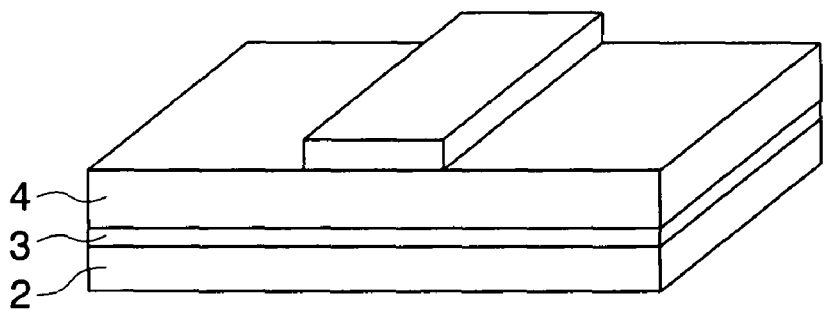
FIG. 12 is a schematic perspective view showing a constitution of a memory cell in a magnetic memory according to a second embodiment.

Next, a constitution of a memory cell in a magnetic memory according to a second embodiment of the present invention is schematically shown in FIG. 12. The memory cell in the magnetic memory according to the embodiment is constituted such that, for example, a barrier metal layer 3 with a film thickness of 10 nm made of Ta has been inserted between the wire 4 connected to the TMR element 6 constituting the memory cell and the yoke 2 in the magnetic memory of the first embodiment. By inserting the barrier metal 3, mutual diffusion between material constituting a composition element for the wire 4, for example, Cu or Al, and material constituting the yoke 2, for example, permalloy (Ni—Fe) can be prevented from occurring. As the barrier metal, any one of TaN, TiN and WN can be used besides Ta. A barrier metal layer may be provided between the yoke 2 and a base substrate 100.

The magnetic memory of the embodiment can also reduce writing current without causing fluctuation of the writing characteristic like the first embodiment.

Third Embodiment

Figure 13:
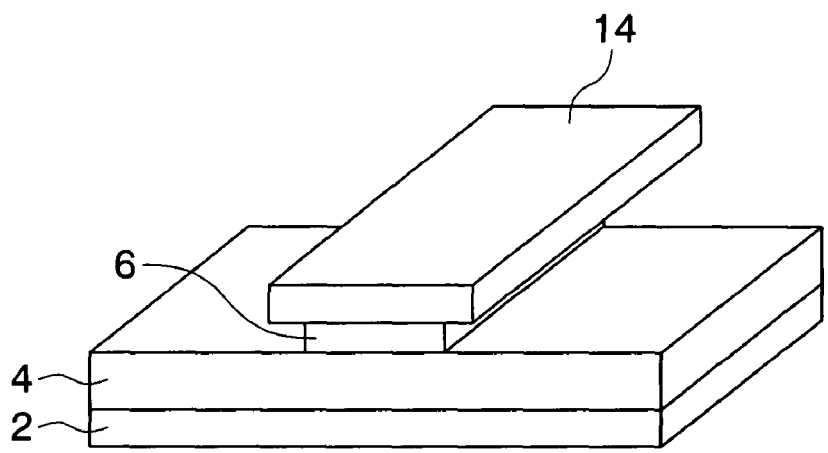
FIG. 13 is a schematic perspective view showing a constitution of a memory cell in a magnetic memory according to a third embodiment.

Next, a constitution of a memory cell of a magnetic memory according to a third embodiment of the present invention is schematically shown in FIG. 13.

In the first and second embodiments, writing is performed by turning on two transistors to cause current to flow in only in the wire 4. At that time, magnetic field required for reversing magnetization of the magnetization free layer 6b of the TMR element 6 serves as a coercive force in a direction of an easy magnetization axis of the TMR element 6.

The third embodiment of the present invention has a constitution that another wire 14 is formed on the TMR element 6 so as to be perpendicular to the wire 4 (refer to FIG. 13). In this embodiment, writing can be performed utilizing asteroid characteristic of the TMR element 6 by causing current to flow in the wire 4 and the wire 14 simultaneously, and writing current is further reduced.

Figure 14:
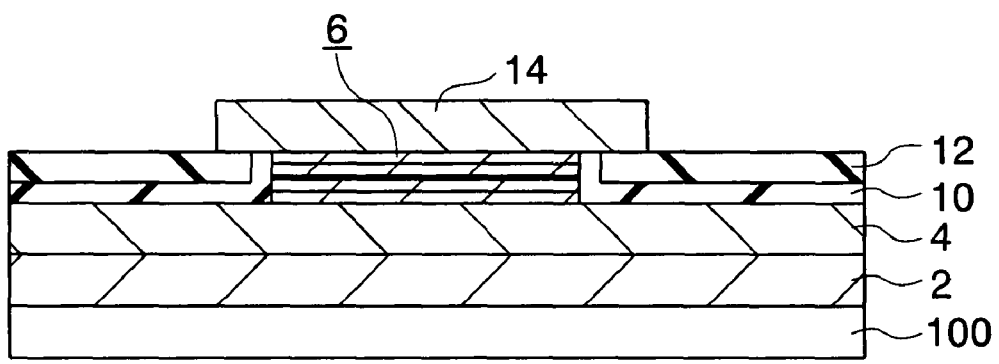
FIG. 14 is a sectional view showing a constitution of the memory cell in the magnetic memory according to the third embodiment.

Next, a method for manufacturing the magnetic memory according to the embodiment will be explained with reference to FIG. 14. The magnetic memory is manufactured like the magnetic memory of the first embodiment utilizing the steps shown in FIGS. 5 to 9 till exposure of the upper electrode layer 6e of the TMR element 6.

Thereafter, after an opening (not shown) for achieving electric connection with the MRAM driving circuit positioned further below is formed, a wiring layer 14 with a three-layered structure of a Ti layer with a film thickness of 30 nm, an Al layer with a film thickness of 300 nm, and a Ti layer with a film thickness of 30 nm is deposited using sputtering process and the wiring layer 14 is patterned so as to be perpendicular to the wiring layer (wire) 4 using lithography technique to be completed (refer to FIG. 14). Thereafter, an insulating layer (not shown) made of SiN or the like is generally deposited on a required portion after the wire 14 is patterned in order to improve reliability.

Figure 15:
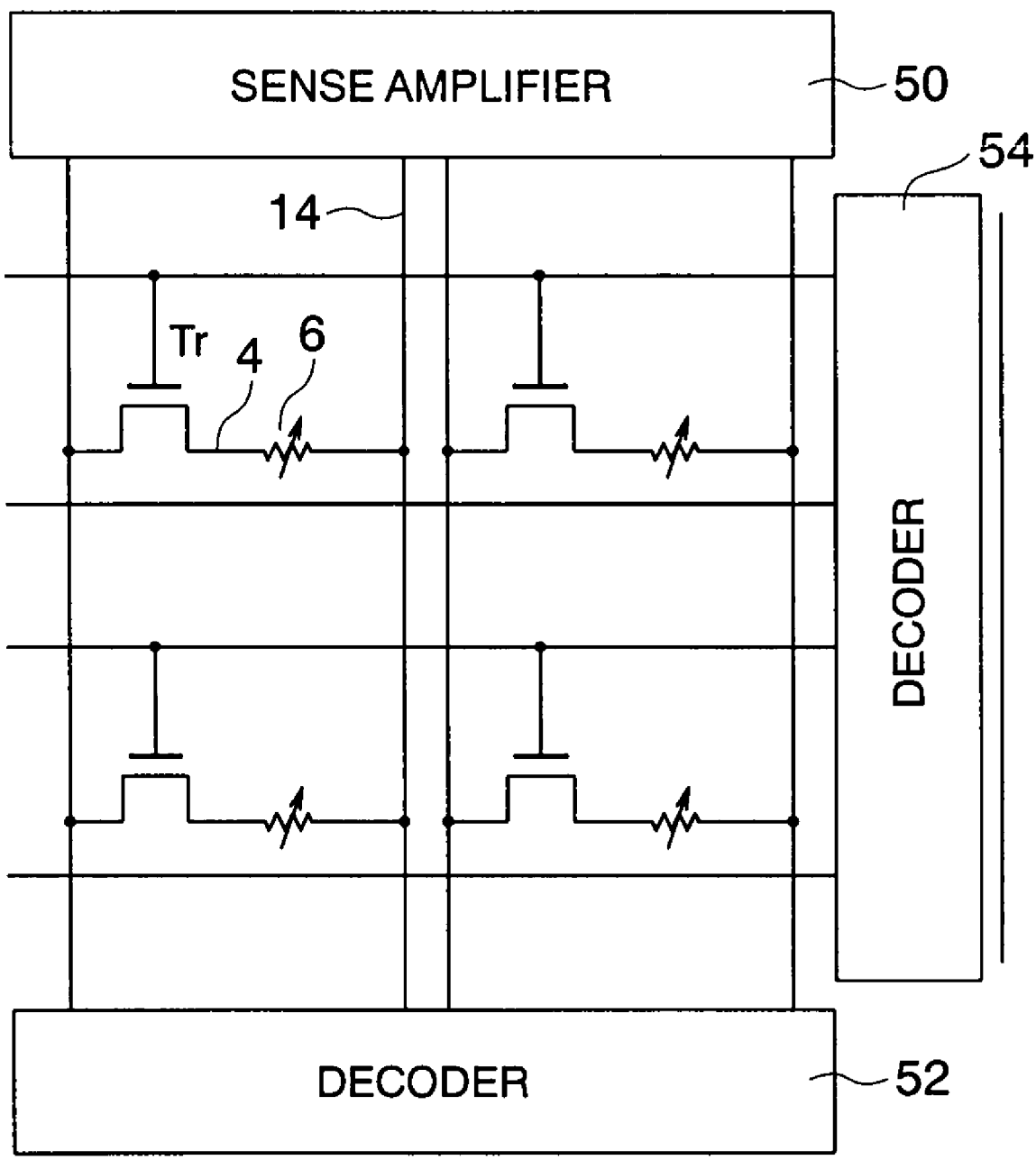
FIG. 15 is an electric circuit diagram showing a constitution of the magnetic memory according to the third embodiment.

FIG. 15 is a circuit diagram showing one specific example of an electric circuit of the magnetic memory according to the third embodiment of the present invention. The magnetic memory of the embodiment is provided with a plurality of memory cells, a sense amplifier 50, and decoders 52, 54. Each memory cell is provided with one TMR element 6 and a selecting transistor Tr corresponding to the TMR element 6, and each memory cell is connected to a wire 4 and a wire 14.

At a writing time, writing is performed by causing current to flow into the wire 4 and the wire 14 simultaneously. At a reading time, reading is performed by turning on the selecting transistor Tr to cause current to flow in the wire 14, the TMR element 6, and the selecting transistor Tr and reading out a resistance value of the TMR element 6. In this embodiment, a reversing magnetic field of the magnetization free layer in the TMR element 6 is reduced to 70% of that in the first embodiment, so that writing current required for writing can be reduced as much as 30% even if currents flowing in the wire 4 and the wire 14 are summed.

If the structures of the wire 4 and the TMR structure 6 and conducting writing using both the wire 4 and the wire 14 are implemented, a design for a memory circuit can be modified freely regardless of the embodiment. For example, modification to a reading circuit with a higher reliability can be made by increasing the number of transistors to be used, or erroneous writing may be prevented by attaching two selecting transistors to the writing wire like the first embodiment.

As described above, according to this embodiment, writing current can be reduced without fluctuation of the writing characteristic.

Fourth Embodiment

Figure 16:
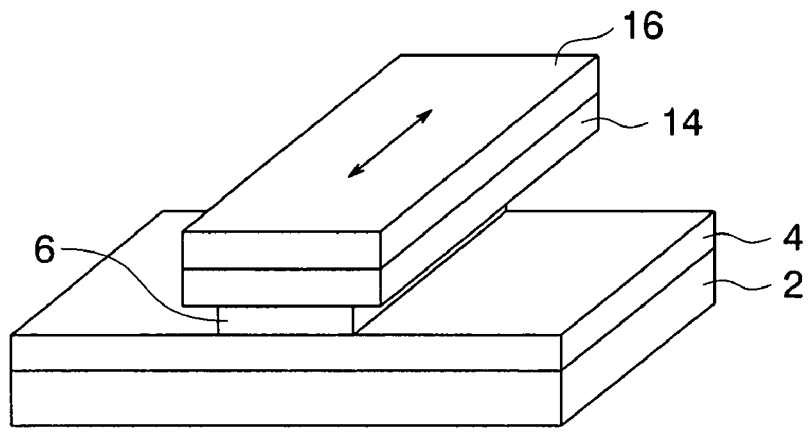
FIG. 16 is a schematic perspective view showing a constitution of a memory cell in a magnetic memory according to a fourth embodiment.
Figure 17:
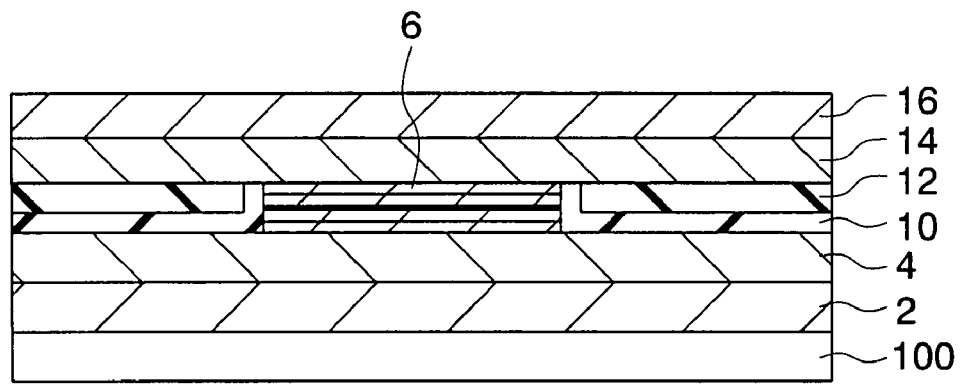
FIG. 17 is a sectional view showing a step of manufacturing of the magnetic memory according to the fourth embodiment.
Figure 18:
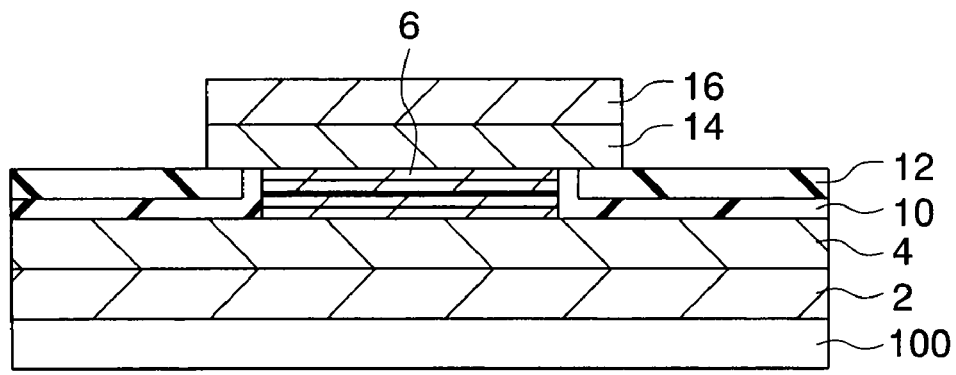
FIG. 18 is a sectional view showing a step of manufacturing of the magnetic memory according to the fourth embodiment.

Next, a magnetic memory according to a fourth embodiment of the present invention will be explained with reference to FIG. 16 to FIG. 18. FIG. 16 is a perspective view schematically showing a constitution of a memory cell in the magnetic memory according to the embodiment. In the above third embodiment, the wire 14 is formed of only a metal layer. In this embodiment, however, as shown in FIG. 16, such a structure is employed that a yoke 16 made of a magnetic layer is stacked on the wiring layer 14. In the embodiment, a barrier layer is not interposed between the yoke 2 made of Ni—Fe and the wire 4 made of Cu, or between the yoke 2 and the base substrate 100, but barrier metal such as Ta, TaN, TiN, W, or WN may be interposed therebetween.

Next, manufacturing steps in a method for manufacturing the magnetic memory according to the embodiment will be explained with reference to FIGS. 17 and 18. The magnetic memory obtained by the manufacturing method is manufactured like the magnetic memory of the first embodiment utilizing the steps shown in FIGS. 5 to 9 till exposure of the upper electrode layer 6e of the TMR element 6.

Subsequently, after an opening for achieving electric connection with the MRAM driving circuit positioned further below is formed, a wiring layer 14 with a three-layered structure of a Ti layer with a film thickness of 30 nm, an Al layer with a film thickness of 300 nm, and a Ti layer with a film thickness of 30 nm is deposited using sputtering process and a yoke 16 with a film thickness of 50 nm made of NiFe is patterned thereon using a sputtering process (refer to FIG. 17). Thereafter, the wiring layer 14 and the magnetic layer 16 are patterned using lithography technique such that a direction of a longitudinal axis of the wiring layer 14 is perpendicular to a direction of a longitudinal axis of the wire 4, so that the wire 14 and the yoke 16 formed thereon is completed. Of course, barrier metal of Ta, TaN, TiN, W, WN or the like may be disposed above, below or above and below the yoke 16.

An insulating layer made of SiN or the like is generally deposited on a required portion after the above wire is patterned in order to improve reliability.

Writing and reading can be performed like the third embodiment. Since the yoke 16 is provided so as to cover the wire 14, the magnitude of the magnetic field generated from the wire 14 becomes larger than that generated in the third embodiment. The shape of asteroid characteristic becomes more symmetrical than that in the third embodiment, so that erroneous writing could be reduced as much as 50%. As a result, this embodiment allowed 20% reduction of writing current as compared with the third embodiment.

As explained above, according to this embodiment, writing current can be reduced without fluctuation in writing characteristic.

Fifth Embodiment

Figure 19:
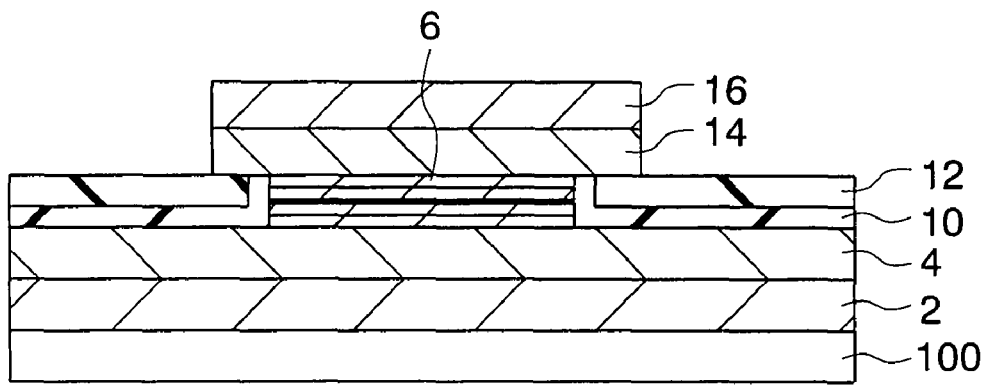
FIG. 19 is a sectional view showing a step of manufacturing of a magnetic memory according to a fifth embodiment.
Figure 20:
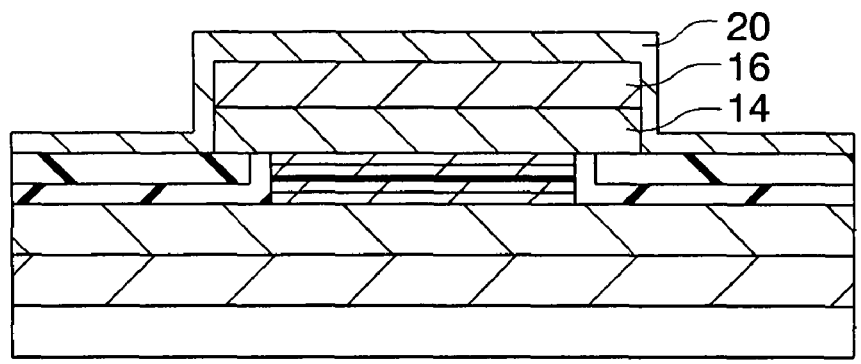
FIG. 20 is a sectional view showing a step of manufacturing of the magnetic memory according to the fifth embodiment.
Figure 21:
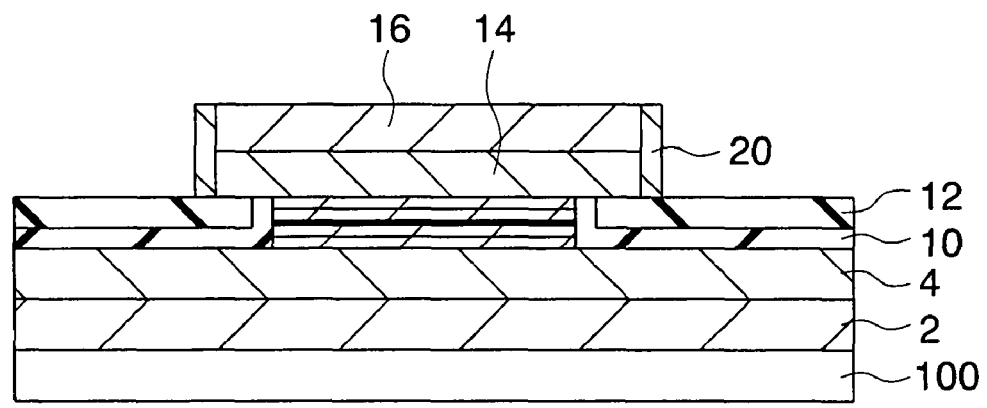
FIG. 21 is a sectional view showing a step of manufacturing of the magnetic memory according to the fifth embodiment.
Figure 22:
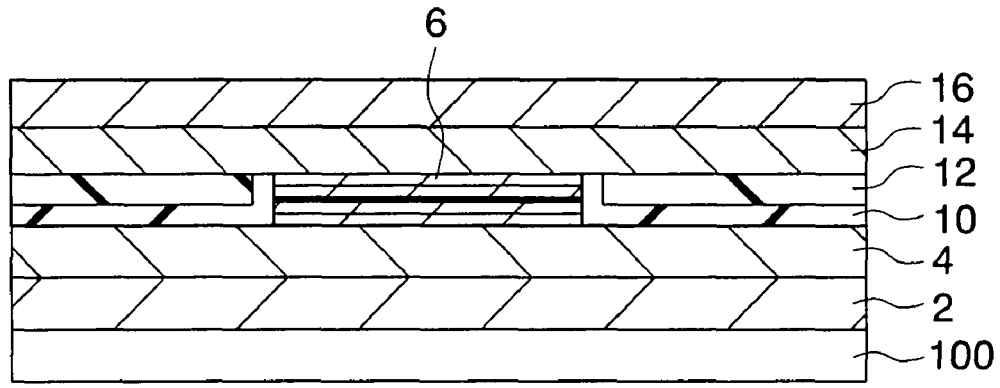
FIG. 22 is a sectional view showing a step of manufacturing of a magnetic memory according to a sixth embodiment.
Figure 23:
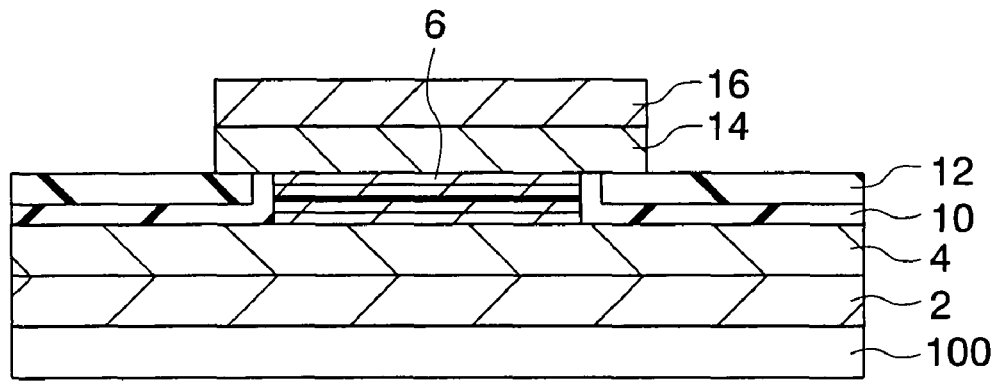
FIG. 23 is a sectional view showing a step of manufacturing of the magnetic memory according to the sixth embodiment.

Next, a magnetic memory according to a fifth embodiment of the present invention will be explained with reference to FIG. 19 to FIG. 21. FIGS. 19 to 21 are sectional views showing steps for manufacturing the magnetic memory according to the embodiment. The magnetic memory of the fourth embodiment employs such a constitution that only an upper face of the wire 14 is covered with the yoke 16, but the magnetic memory of this embodiment is constituted such that not only an top face of the wire 14 but also side faces thereof are provided with a magnetic layer (yoke) 20.

First, the magnetic memory of the embodiment is manufactured like the magnetic memory of the first embodiment utilizing the steps shown in FIGS. 5 to 9 till exposure of the upper electrode layer 6e of the TMR element 6. Subsequently, after an opening for achieving electric connection with the MRAM driving circuit positioned further below is formed, a wiring layer 14 with a three-layered structure of a Ti layer with a film thickness of 30 nm, an Al layer with a film thickness of 300 nm, and a Ti layer with a film thickness of 30 nm is deposited using sputtering process, and a yoke 16 with a thickness of 50 nm made of NiFe is patterned thereon using a sputtering process. Thereafter, the wiring layer 14 and the magnetic layer 16 are patterned using lithography technique such that a direction of an longitudinal axis of the wiring layer 14 is perpendicular to a direction of a longitudinal axis of the wire 4, so that the wire 14 and the yoke 16 formed thereon is completed (refer to FIG. 19).

Then, a magnetic layer 20 with a film thickness of 60 nm made of NiFe is further deposited on the whole surface using sputtering process (refer to FIG. 20). Of course, barrier metal of Ta, TaN, TiN, W, WN, or the like is disposed above or below the magnetic layer 20. Subsequently, the magnetic layer (yoke) 20 is left only on side faces of the wiring layer 14 and the yoke 16 by performing etch back on the whole face of the magnetic layer 20 until the insulating layer 12 is exposed (refer to FIG. 21). In this embodiment, an RIE apparatus in which argon gas is mainly introduced is used for performing the etch back, but an ion milling apparatus may also be used therefor.

An insulating layer made of SiN or the like is generally deposited on a required portion after the above wire is patterned in order to improve reliability.

Writing and reading can be performed like the third embodiment. In this embodiment, since such a constitution is employed that the top face of the wire 14 is covered with the yoke 16 and the side faces thereof are surrounded by the yoke 20, magnetic field can be applied to the TMR element 6 more effectively. The asteroid characteristic became substantially completely symmetrical so that erroneous writing could be reduced. As a result, in the embodiment, writing current could be reduced 20% from that in the fourth embodiment.

As explained above, according to this embodiment, writing current can be reduced without fluctuation in writing characteristic.

Sixth Embodiment

Next, a magnetic memory according to a sixth embodiment of the present invention will be explained with reference to FIG. 22 to FIG. 26. FIGS. 22 to 26 are sectional views showing steps for manufacturing the magnetic memory according to the embodiment. The magnetic memory of the fifth embodiment employs such a constitution that the yoke 16 is formed on the top face of the wire 14 and the yoke 20 is formed on the side faces thereof. In this embodiment, however the yoke 20 on the side faces of the wire 14 is formed so as to extend to a position of the magnetization free layer in the TMR element 6.

First, the magnetic memory of the embodiment is manufactured like the magnetic memory of the first embodiment utilizing the steps shown in FIGS. 5 to 9 till exposure of the upper electrode layer 6e of the TMR element 6. Subsequently, after an opening for achieving electric connection with the MRAM driving circuit positioned further below is formed, a wiring layer 14 with a three-layered structure of a Ti layer with a film thickness of 30 nm, an Al layer with a film thickness of 300 nm, and a Ti layer with a film thickness of 30 nm is deposited using sputtering process, and a yoke 16 with a film thickness of 50 nm made of NiFe is patterned thereon using a sputtering process (refer to FIG. 22). Thereafter, the wiring layer 14 and the magnetic layer 16 are patterned using lithography technique such that a direction of a longitudinal axis of the wiring layer 14 is perpendicular to a direction of a longitudinal axis of the wire 4, so that the wire 14 and the yoke 16 formed thereon is completed (refer to FIG. 23). Of course, barrier metal of Ta, TaN, TiN, W, WN or the like may be disposed above, below or above and below the yoke 16.

Figure 24:
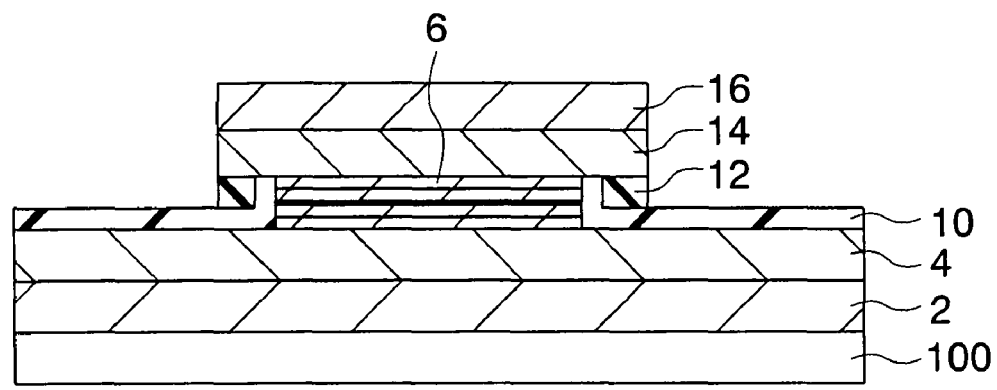
FIG. 24 is a sectional view showing a step of manufacturing of the magnetic memory according to the sixth embodiment.

The insulating film 12 made of $SiO_2$ is selectively etched in an RIE apparatus using etching gas which mainly includes $CF_4$, so that the insulating film 10 made of $Al_2O_3$ is exposed (refer to FIG. 24). In this embodiment, the film thickness of the insulating film 10 made of $Al_2O_3$ is set to 30 nm, and it is the same as thickness from the wire 4 to the magnetization free layer of the TMR element 6. Accordingly, the film thickness of the insulating film 10 made of $Al_2O_3$ should vary so as to correspond to the constitution of the TMR element 6.

Figure 25:
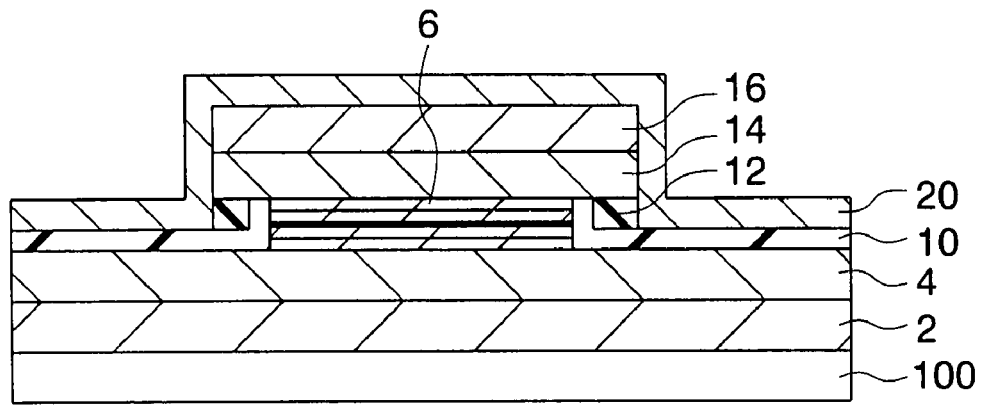
FIG. 25 is a sectional view showing a step of manufacturing of the magnetic memory according to the sixth embodiment.
Figure 26:
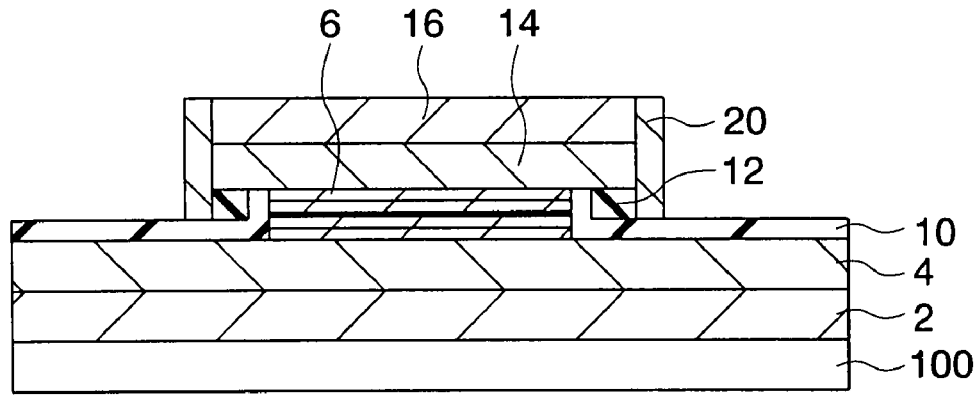
FIG. 26 is a sectional view showing a step of manufacturing of the magnetic memory according to the sixth embodiment.

Thereafter, a magnetic layer 20 with a film thickness of 60 nm made of NiFe is further deposited on the whole surface using sputtering process (refer to FIG. 25). Of course, barrier metal of Ta, TaN, TiN, W, WN, or the like is disposed above, below or above and below the magnetic layer 20. Then, the magnetic layer (yoke) 20 is left only on side faces of the insulting layer 12, the wiring layer 14, and the yoke 16 by performing etch back on the magnetic layer 20 until the insulating layer 10 made of $Al_2O_3$ is exposed. In this embodiment, an RIE apparatus in which argon gas is mainly introduced is used for performing the etch back, but an ion milling apparatus may also be used therefor. In the RIE using argon gas mainly, since a selective ratio of NiFe constituting the yoke 20 and the $Al_2O_3$ constituting the insulating film 10 can be taken to be about 20, such a drawback that the insulating layer 10 made of Al$_2$O$_3$ is cut in to expose the wire 4 can be prevented. It is known that, when etching is performed using argon gas, material or metal removed by the etching is re-adhered to the magnetic layer 20 on the side wall of the wire 14 to lower the efficiency of the induced magnetic field generated from the wire 14. In this embodiment, it is possible to remove the material or metal re-adhered to the magnetic layer 10 on the side wall of the wire 14 while the insulating layer 10 made of Al$_2$O$_3$ is being etched after the magnetic layer 20 on the top face of the magnetic layer 16 is etched.

An insulating layer made of SiN or the like is generally deposited on a required portion after the above wire is patterned in order to improve reliability.

Writing and reading operations can be performed like the third embodiment. Since the magnetic layer 20 extends downwardly to the side face of the magnetizable in the TMR element 6, magnetic field can be caused to act on the TMR element 6 more effectively. As a result, in this embodiment, writing current could be reduced 20% as compared with the fifth embodiment.

As explained above, according to this embodiment, writing current can be reduced without fluctuation in writing characteristic.

Seventh Embodiment

Figure 27:
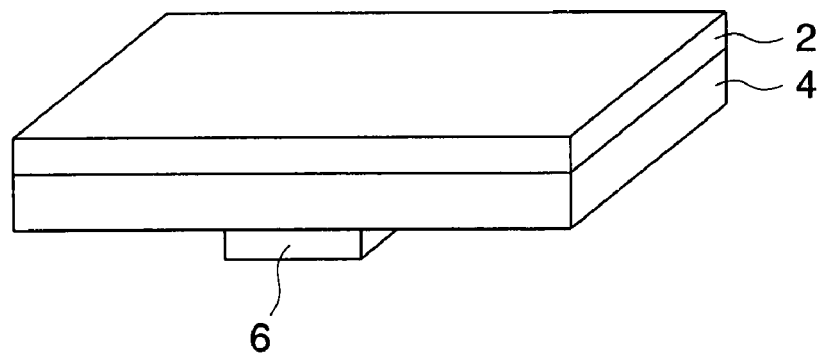
FIG. 27 is a schematic perspective view showing a constitution of a memory cell in a magnetic memory according to a seventh embodiment.

Next, a magnetic memory according to a seventh embodiment of the present invention will be explained with reference to FIG. 27 to FIG. 33. FIG. 27 is a perspective view schematically showing a memory cell in a magnetic memory according to this embodiment, and FIGS. 28 to 33 are sectional views showing manufacturing steps of a magnetic memory according to the embodiment. The magnetic memory of the embodiment is constituted such that an arranging relationship between the TMR element 6 and the wiring layer 4 is reversed upside down.

Next, a method for manufacturing a magnetic memory according to the embodiment will be explained.

Figure 28:
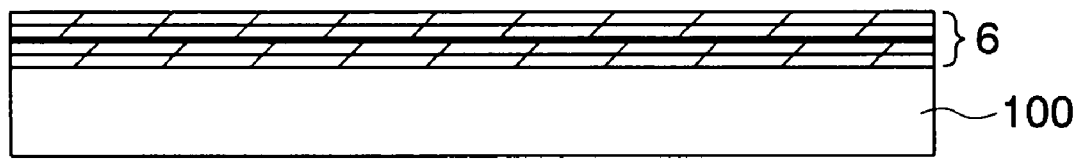
FIG. 28 is a sectional view showing a step of manufacturing of the magnetic memory according to the seventh embodiment.

As shown in FIG. 28, first, a stacked layers film constituting the TMR element 6 is deposited on a substrate 100 including a lower layer where a driving circuit for a memory section and the like have been fabricated. In the embodiment, the stacked layers in the TMR element 6 are prepared by sequentially stacking Ta serving as a lower electrode layer, Co—Fe—Ni serving as magnetizable, Al$_2$O$_3$ obtained by plasma-oxidizing Al and serving as a tunnel barrier layer, Co—Fe serving as the magnetization pinned layer, Ir—Mn serving as an anti-ferromagnetic layer, and Ta serving as an upper electrode layer.

Figure 29:
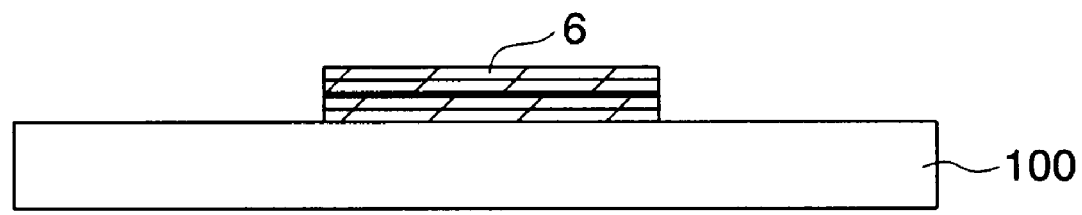
FIG. 29 is a sectional view showing a step of manufacturing of the magnetic memory according to the seventh embodiment.
Figure 30:
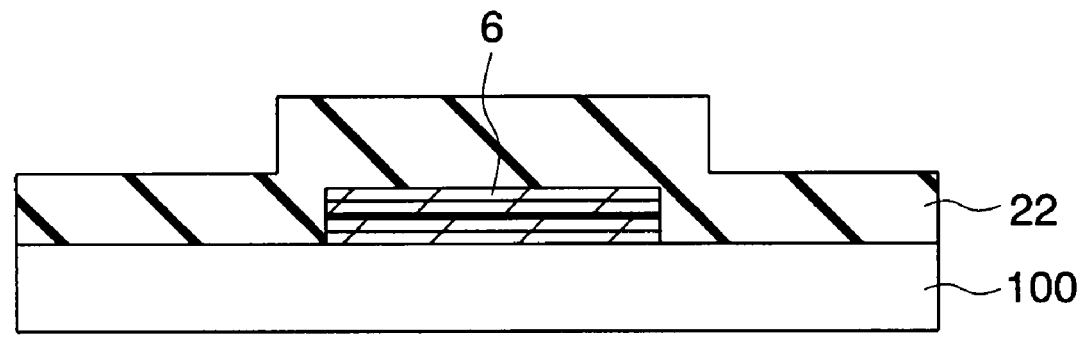
FIG. 30 is a sectional view showing a step of manufacturing of the magnetic memory according to the seventh embodiment.

Next, processing is conducted by performing etching for defining a long side edge of the TMR element 6 (refer to FIG. 29). Since an etching mask may define only a long side of the TMR element 6 using photolithography, a mask with a shape perpendicular to the wiring layer 4 obtained by connecting long sides of a plurality of TMR elements 6 is used.

Figure 31:
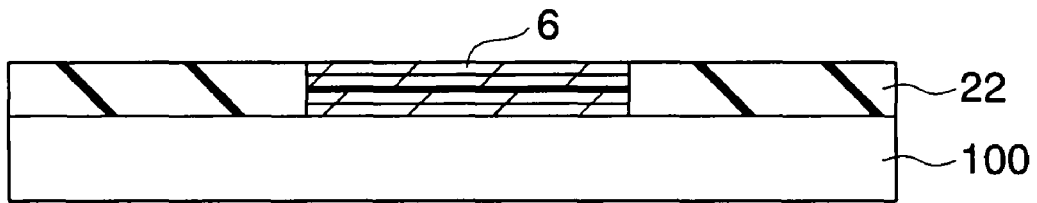
FIG. 31 is a sectional view showing a step of manufacturing of the magnetic memory according to the seventh embodiment.

Next, TEOS is plasma-decomposed to deposit an insulating film 22 with a thickness of 100 nm made of SiO$_2$ using a PECVD process (refer to FIG. 30), and after planarization resist is applied on the insulating film 22, etch back is performed on the insulating film 22 to expose an upper electrode layer in the TMR element 6 (refer to FIG. 31).

Figure 32:
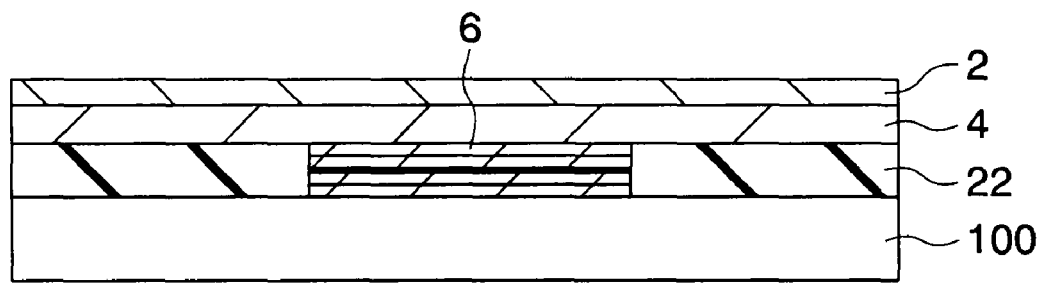
FIG. 32 is a sectional view showing a step of manufacturing of the magnetic memory according to the seventh embodiment.

Thereafter, after an opening (not shown) for achieving electric connection with the MRAM driving circuit positioned further below is formed in the insulating film 22, a wiring layer 4 with a film thickness of 20 nm made of Cu and a magnetic layer 2 with a film thickness of 10 nm made of Ni—Fe are sequentially deposited on the insulating layer 22 so as to fill in the opening (refer to FIG. 32). In the embodiment, barrier metal is neither disposed above, below, nor above and below the magnetic layer 2 made of Ni—Fe, but barrier metal of Ta, TaN, TiN, W, WN, or the like may be disposed, of course.

Figure 33:
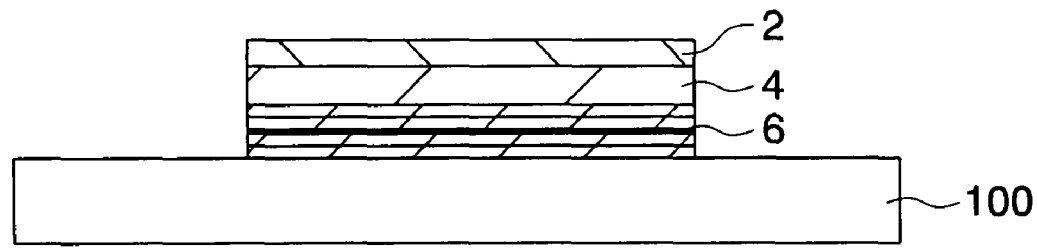
FIG. 33 is a sectional view showing a step of manufacturing of the magnetic memory according to the seventh embodiment.

Etching process is applied to the stacked layers of the magnetic layer 2 to the lower electrode layer in the TMR layer 6 such that the wiring layer 4 is formed in a predetermined shape (refer to FIG. 33). Since an etching mask used at that time may define only a short side of the TMR element 6 and the wiring layer 4 using photography, a mask with a shape obtained by connecting short sides of a plurality of TMR elements may be used as the etching mask. The length of the wiring layer 4 in its longitudinal direction or the like is determined by the etching process. FIGS. 28 to 32 are sectional views taken along a plane extending along a short side direction of the TMR element 6, and FIG. 33 is a sectional view taken along a plane extending along a longitudinal side direction of the TMR element 6. That is, FIG. 33 shows a section perpendicular to sections shown in FIGS. 28 to 32.

In the embodiment, an RIE apparatus in which argon gas is mainly introduced is used for performing the etch back, but an ion milling apparatus may also be used therefor. The TMR element 6 is an element including the upper and lower layers separated from each other by an extremely thin tunnel barrier layer, where it is important for improvement in process yield that the upper layer and the lower layer are not short-circuited during etching process. The inventors have tried various etching work processes and have found that a main factor of short-circuiting is re-adhesion of material or metal which has been removed by etching process to the vicinity of the tunnel barrier layer. In the embodiment, the lower electrode layer which is a lower layer is removed by etching, and thereafter metal which has been re-adhered to a side wall at a short side of the TMR element 6 is removed while an insulating layer (not shown) which is a lower layer is subsequently being etched, so that the process yield is improved.

The TMR element 6 having the writing wire 4 is completed in this manner. In the seventh embodiment, a circuit electrically equivalent to that in the first embodiment is manufactured. Since it is unnecessary to form a wire for connection with the lower electrode in the TMR element 6 in the seventh embodiment, the number of steps is reduced, so that manufacturing can be performed inexpensively in mass production.

An insulating layer made of SiN or the like is generally deposited on a required portion after the above wire is processed in order to improve reliability. Writing-in and reading-out operations are performed like the first embodiment.

As explained above, according to this embodiment, writing current can be reduced without fluctuation in writing characteristic.

Eighth Embodiment

Next, a magnetic memory according to an eighth embodiment of the present invention will be explained with reference to FIG. 34 to FIG. 39. FIGS. 34 to 39 are sectional views showing steps for manufacturing the magnetic memory according to the embodiment. The magnetic memory of the embodiment employs such a constitution that a writing wire 14 is further provided below the TMR element 6 in the seventh embodiment.

Figure 34:
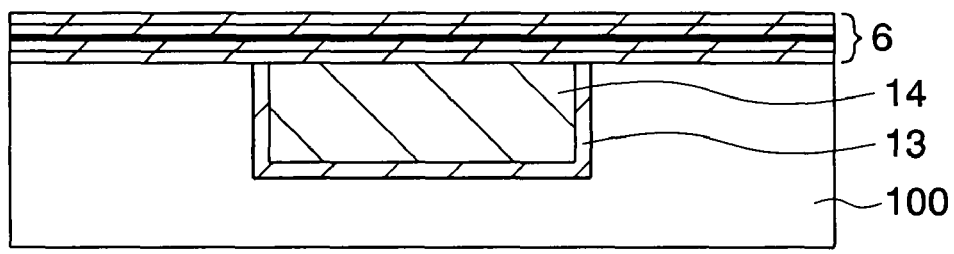
FIG. 34 is a sectional view showing a step of manufacturing of a magnetic memory according to an eighth embodiment.

A writing wire 14 is formed on a substrate 100 including a lower layer where a driving circuit for a memory section and the like have been fabricated so as to be perpendicular to a wire 4 described later (refer to FIG. 34). In the embodiment, the wire 14 is formed utilizing damascene process using Cu. Respective steps performed in the damascene process are well-known, and explanation thereof will be omitted here. Of course, a process where, after a wire 14 is formed of Al and embedding with an insulating film of SiOx or the like is performed, the wire 14 is exposed by planarization may be employed. In the embodiment, barrier metal 13 is provided between the substrate 100 and the wire 14 (refer to FIG. 34). Then, a stacked layers film constituting a TMR element 6 is deposited (refer to FIG. 35). In the embodiment, stacked layers constituting the TMR element 6 are formed by defining a lower layer side as a magnetization free layer, and stacking Ta serving as a lower electrode layer, Co—Fe—Ni serving as a magnetization free layer, $Al_2O_3$ obtained by plasma-oxidizing Al and serving as a tunnel barrier layer, Co—Fe serving as a magnetization pinned layer, Ir—Mn serving as an anti-ferromagnetic layer, and Ta serving as an upper electrode (not shown).

Figure 35:
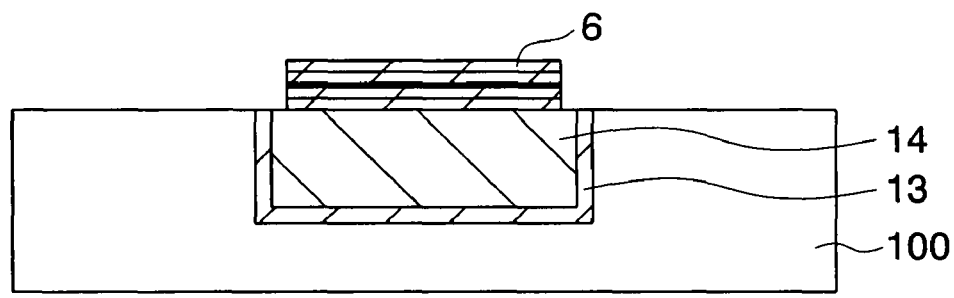
FIG. 35 is a sectional view showing a step of manufacturing of the magnetic memory according to the eighth embodiment.

Next, processing is conducted by performing etching for defining a long side edge of the TMR element 6 (refer to FIG. 35). Since an etching mask may define only a long side of the TMR element 6 using photolithography, a mask having a shape which is perpendicular to the wiring layer 4 described later and which is obtained by connecting long sides of a plurality of TMR elements is used.

Figure 36:
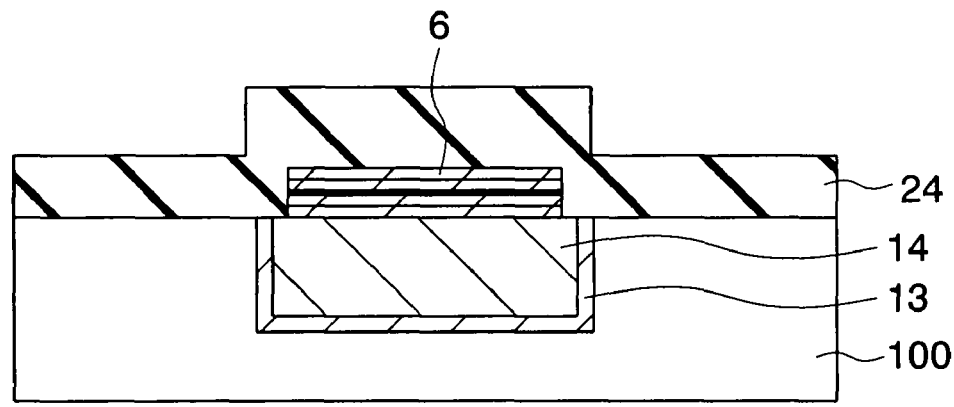
FIG. 36 is a sectional view showing a step of manufacturing of the magnetic memory according to the eighth embodiment.
Figure 37:
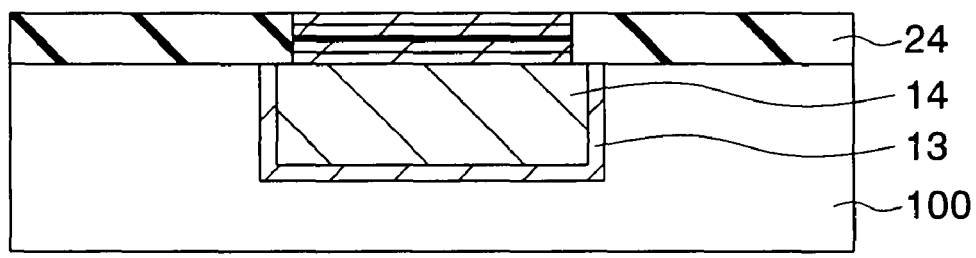
FIG. 37 is a sectional view showing a step of manufacturing of the magnetic memory according to the eighth embodiment.

Next, TEOS is plasma-decomposed to deposit an insulating film 24 with a thickness of 100 nm made of $SiO_2$ using a PECVD process (refer to FIG. 36). Subsequently, after material for planarization such as planarization resist is applied on the insulating film 24, an upper electrode layer in the TMR element 6 is exposed using a whole face etch back process such as RIE or CMP (refer to FIG. 37).

Figure 38:
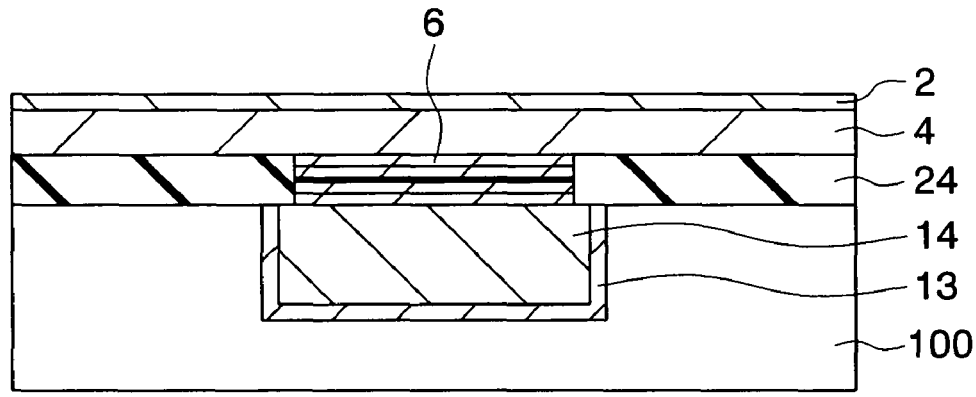
FIG. 38 is a sectional view showing a step of manufacturing of the magnetic memory according to the eighth embodiment.

Next, after an opening (not shown) for achieving electric connection with the MRAM driving circuit positioned further below is formed in the insulating film 24, a wiring layer 4 with a film thickness of 20 nm made of Cu and a magnetic layer 2 with a film thickness of 10 nm made of Ni—Fe are sequentially deposited on the whole surface of the insulating layer 24 so as to fill in the opening (refer to FIG. 38). In the embodiment, barrier metal is not disposed above, below, or above and below the magnetic layer 2 made of Ni—Fe, but barrier metal of Ta, TaN, TiN, W, WN, or the like may be disposed, of course.

Figure 39:
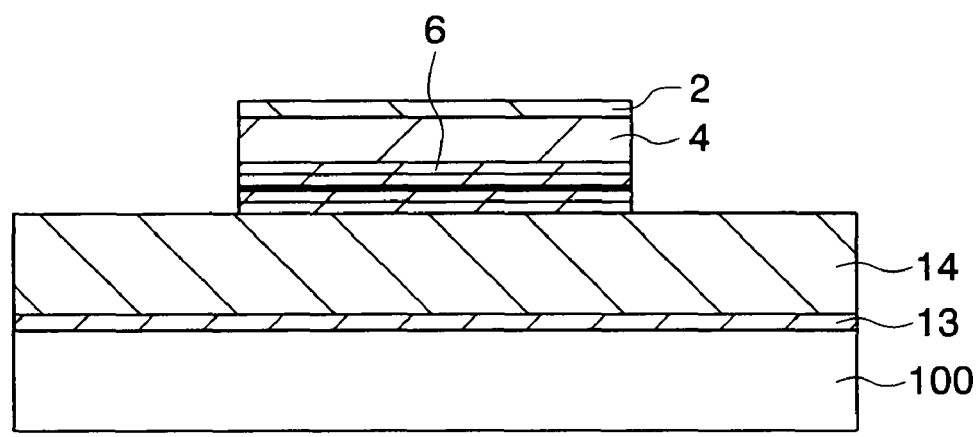
FIG. 39 is a sectional view showing a step of manufacturing of the magnetic memory according to the eighth embodiment.

Next, etching process is applied to the stacked layers of the magnetic layer 2 to the lower electrode layer in the TMR layer 6 such that the wiring layer 4 is formed in a predetermined shape (refer to FIG. 39). Since an etching mask used at that time may define only a short side of the TMR element 6 and the wiring layer 4 using photography, a mask with a shape obtained by connecting short sides of a plurality of TMR elements may be used as the etching mask. The length of the wiring layer 4 in its longitudinal direction or the like is determined by the etching process. FIGS. 34 to 38 are sectional views taken along a plane extending along a short side direction of the TMR element 6, and FIG. 39 is a sectional view taken along a plane extending along a longitudinal side direction of the TMR element 6. That is, FIG. 39 is a section perpendicular to sections shown in FIGS. 34 to 38. In the embodiment, an RIE apparatus in which argon gas is mainly introduced is used for performing the etch back, but an ion milling apparatus may also be used therefor.

The TMR element 6 having the writing wire 4 is completed in this manner. An insulating layer (not shown) made of SiN or the like is generally deposited on a required portion after the above wire is processed in order to improve reliability. Writing and reading operations are performed like the third embodiment.

As explained above, according to this embodiment, writing current can be reduced without fluctuation in writing characteristic.

Ninth Embodiment

Next, a magnetic memory according to a ninth embodiment of the present invention will be explained with reference to FIG. 40 to FIG. 49. FIGS. 40 to 49 are sectional views showing steps for manufacturing the magnetic memory according to the embodiment. The magnetic memory of the embodiment employs such a constitution that a magnetic layer 16 is provided below a wiring layer 14 in the magnetic memory in the eighth embodiment.

Figure 40:
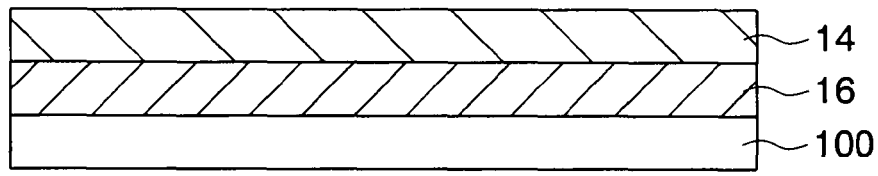
FIG. 40 is a sectional view showing a step of manufacturing of a magnetic memory according to a ninth embodiment.
Figure 41:
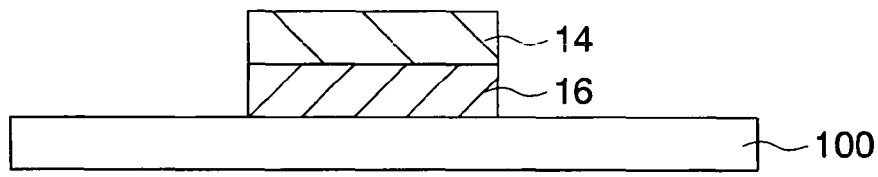
FIG. 41 is a sectional view showing a step of manufacturing of the magnetic memory according to the ninth embodiment.

A magnetic layer 16 with a film thickness of 50 nm made of NiFe, and a wiring layer 14 with a three-layered structure of a Ti layer with a film thickness of 30 nm, an Al layer with a film thickness of 30 nm, and a Ti layer with a film thickness of 30 nm are sequentially deposited on a substrate 100 including a lower layer where a driving circuit for a memory section and the like have been fabricated (refer to FIG. 40). Subsequently, the magnetic layer 16 and the wiring layer 14 are patterned so as to be perpendicular to a wiring layer 4 described later by using an RIE apparatus (refer to FIG. 41).

Figure 42:
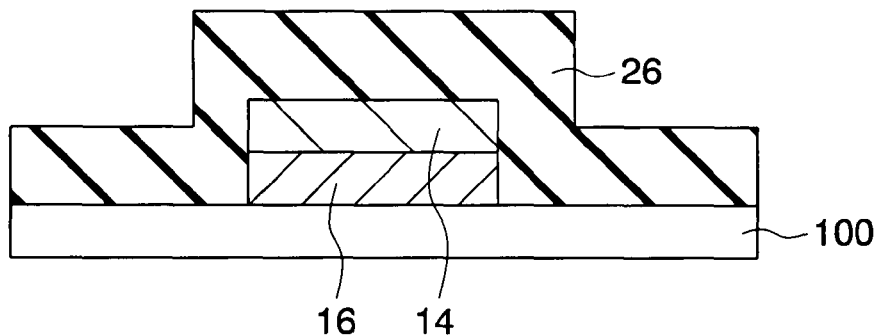
FIG. 42 is a sectional view showing a step of manufacturing of the magnetic memory according to the ninth embodiment.
Figure 43:
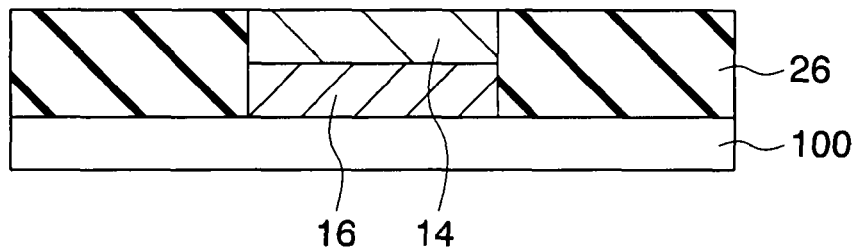
FIG. 43 is a sectional view showing a step of manufacturing of the magnetic memory according to the ninth embodiment.

Thereafter, TEOS is plasma-decomposed to deposit an insulating film 26 with a thickness of 100 nm made of $SiO_2$ using a PECVD process (refer to FIG. 42). Further, after material for planarization such as planarization resist is applied on the insulating film 26, a whole surface etch back is performed utilizing a combination of RIE and CMP to expose a surface of the wiring layer 14 (refer to FIG. 43).

Figure 44:
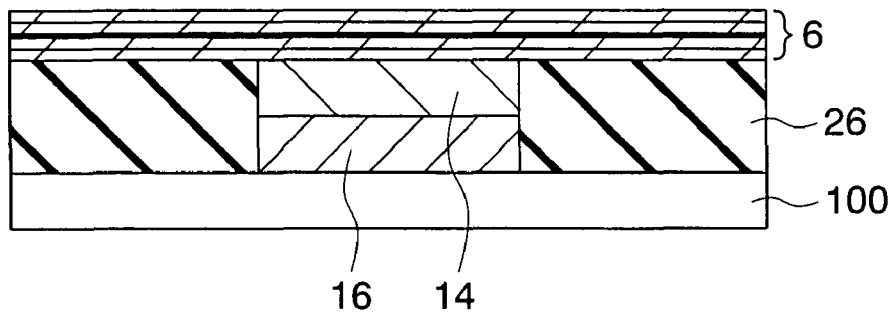
FIG. 44 is a sectional view showing a step of manufacturing of the magnetic memory according to the ninth embodiment.

Then, a stacked layers film 6 constituting a TMR element is deposited on a whole surface of the insulating film 26 (refer to FIG. 44). In the embodiment, stacked layers constituting the TMR element 6 are formed by defining a lower layer side as a magnetization free layer, and stacking Ta serving as a lower electrode layer, Co—Fe—Ni serving as a magnetization free layer, $Al_2O_3$ obtained by plasma-oxidizing Al and serving as a tunnel barrier layer, Co—Fe serving as a magnetization pinned layer, Ir—Mn serving as an anti-ferromagnetic layer, and Ta serving as an upper electrode.

Figure 45:
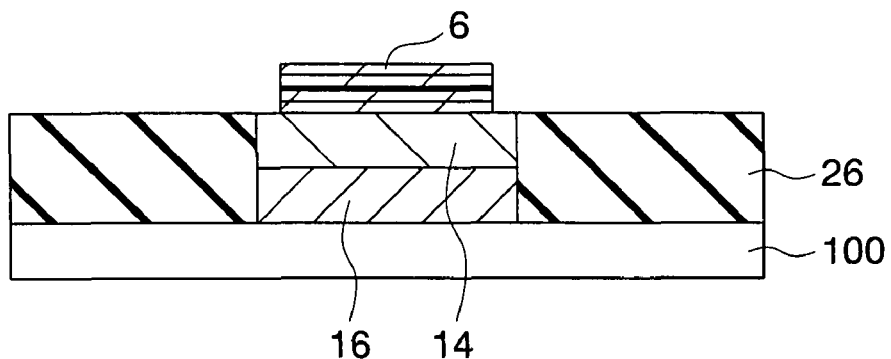
FIG. 45 is a sectional view showing a step of manufacturing of the magnetic memory according to the ninth embodiment.

Next, processing is conducted on the stacked layers film 6 by performing etching for defining a long side edge of the TMR element 6 (refer to FIG. 45). Since an etching mask may define only a long side of the TMR element 6 using photolithography, a mask having a shape which is perpendicular to the wiring layer 4 described later and which is obtained by connecting long sides of a plurality of TMR elements, is used.

Figure 46:
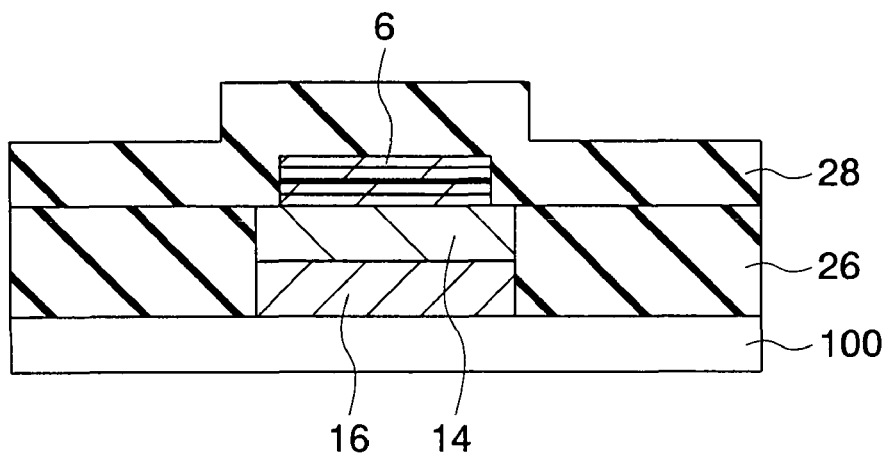
FIG. 46 is a sectional view showing a step of manufacturing of the magnetic memory according to the ninth embodiment.
Figure 47:
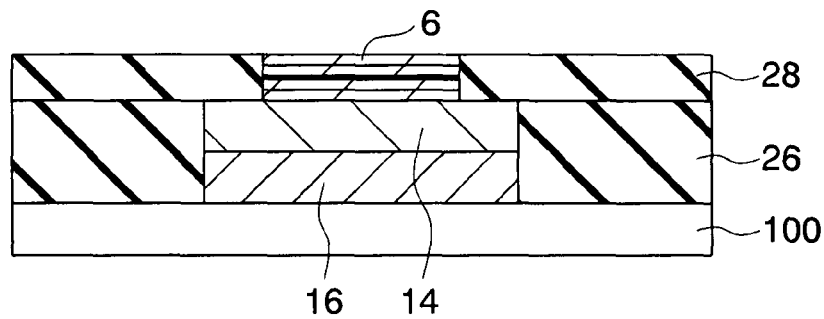
FIG. 47 is a sectional view showing a step of manufacturing of the magnetic memory according to the ninth embodiment.

Next, TEOS is plasma-decomposed to deposit an insulating film 28 with a thickness of 100 nm made of $SiO_2$ using a PECVD process (refer to FIG. 46). Subsequently, after material for planarization such as planarization resist is applied on the insulating film 28, etch back is applied to the insulating film 28 to expose an upper electrode layer in the TMR element 6 using an etch back process such as RIE or CMP (refer to FIG. 47).

Figure 48:
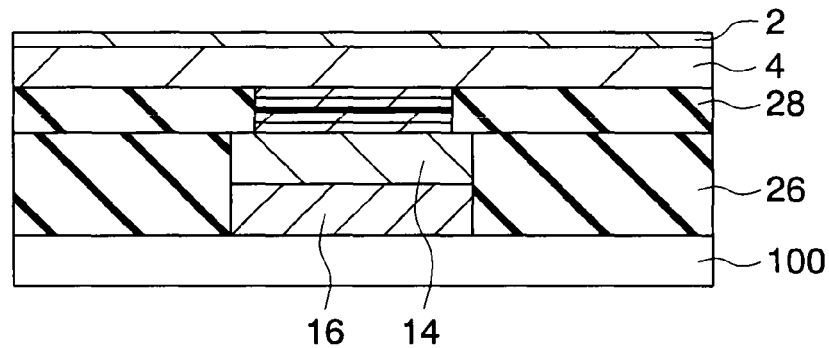
FIG. 48 is a sectional view showing a step of manufacturing of the magnetic memory according to the ninth embodiment.

After an opening (not shown) for achieving electric connection with the MRAM driving circuit positioned further below is formed in the insulating film 28, a wiring layer 4 with a film thickness of 20 nm made of Cu and a magnetic layer 2 with a film thickness of 10 nm made of Ni—Fe are sequentially deposited on the insulating layer 28 so as to fill in the opening (refer to FIG. 48). In the embodiment, barrier metal is neither disposed above, below, nor above and below the magnetic layer 2 made of Ni—Fe, but barrier metal of Ta, TaN, TiN, W, WN, or the like may be disposed, of course.

Figure 49:
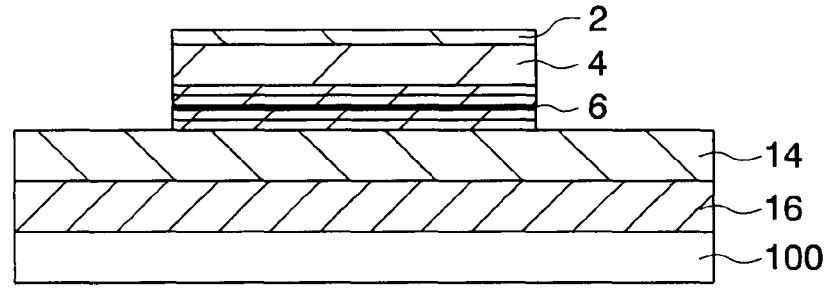
FIG. 49 is a sectional view showing a step of manufacturing of the magnetic memory according to the ninth embodiment.

Next, etching process is applied to the stacked layers of the magnetic layer 2 to the lower electrode layer in the TMR layer 6 such that the wiring layer 4 is formed in a predetermined shape (refer to FIG. 49). Since an etching mask may define only a short side of the TMR element and the wiring layer 4 using photography, a mask with a wiring shape obtained by connecting short sides of a plurality of TMR elements may be used as the etching mask. The length of the wiring layer 4 in its longitudinal direction or the like is determined by the etching process. FIGS. 40 to 48 are sectional views taken along a plane extending along a short side direction of the TMR element 6, and FIG. 49 is a sectional view taken along a plane extending along a longitudinal side direction of the TMR element 6. That is, FIG. 49 is a section perpendicular to sections shown in FIGS. 40 to 48.

An insulating layer made of SiN or the like is generally deposited on a required portion after the above wire is processed in order to improve reliability. Writing and reading operations are performed like the third embodiment.

As explained above, according to this embodiment, writing current can be reduced without fluctuation in writing characteristic.

Tenth Embodiment

Figure 50:
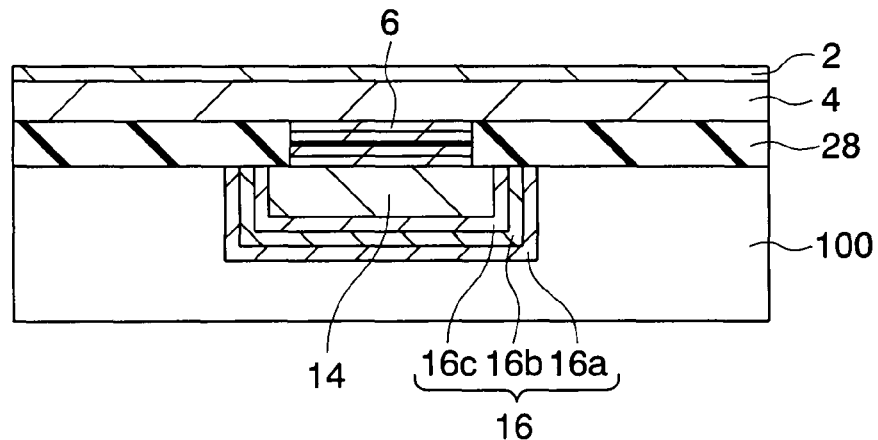
FIG. 50 is a sectional view showing a constitution of a memory cell in a magnetic memory according to a tenth embodiment.

Next, a magnetic memory according to a tenth embodiment of the present invention will be explained with reference to FIG. 50. FIG. 50 is a sectional view schematically showing a constitution of a memory cell in a magnetic memory according to the embodiment. The magnetic memory of the embodiment employs such a structure that a magnetic layer 16 is formed on not only a lower face of a wiring layer 14 but also a side face thereof in the magnetic memory according to the ninth embodiment.

A method for manufacturing the magnetic memory of the embodiment will be explained. A magnetic layer 16 with a three-layered structure of a TaN film 16a with a film thickness of 30 nm, a NiFe film 16b with a film thickness of 60 nm, and a TiN film 16c with a film thickness of 30 nm is formed, using sputtering process, on a surface of a groove in a substrate 100 including a lower layer where a driving circuit for a memory section and the like have been fabricated, and thereafter a wiring layer 14 made of Cu is formed using damascene process so as to fill in the groove (refer to FIG. 50). Respective steps in the damascene process are well-known and explanation thereof is omitted.

A stacked layers film 6 constituting a TMR element is deposited on the wiring layer 14. Steps subsequent thereto are performed like the ninth embodiment, where an insulating film 28 is provided on a side face of the TMR element, a wiring layer 4 is formed so as to electrically connect to the upper electrode in the TMR element 6, and a magnetic layer 2 serving as a yoke is formed on the wiring layer 4 (refer to FIG. 50). Writing and reading operations are performed like the third embodiment.

As explained above, according to this embodiment, writing current can be reduced without fluctuation in writing characteristic.

For constituting a MRAM with a mass storage, for example, a 32 Mbit class, it is necessary reduce a ratio of an area occupied by a peripheral circuit to increase an occupation ratio of a memory array. Therefore, it is necessary to set an array block size per unit to a 1 Mbit array. However, since a writing current value is as large as several mA to 10 mA at present, a voltage in the order of 2V is generated at both ends of a writing wire resistor, which not only makes it impossible to achieve voltage reduction down to the order of 1V but also makes it difficult to raise a writing current waveform at a high speed. Thus, a high speed memory or storage can not be realized.

In order to achieve mass storage (higher integration), when a width of a tunnel junction element (hereinafter, also called MTJ (Magnetic Tunneling Junction) which is a storage element included in each cell in MRAM is reduced to be fine, thermal agitation resistance is remarkably reduced, which results in difficulty in securing non-volatile.

Further, in a system where writing current is caused to flow in both a bit line and a word line and writing is performed at an MTJ cell positioned at a crossing point of the bit line and the word line, erroneous writing may occur at an MTJ cell positioned at another point other than the crossing point and excited to a semi-selected state or it may be difficult to secure non-volatile of the excited MTJ cell. That is, since a margin for writing is reduced, erroneous writing may occur or it may be difficult to secure non-volatile.

A reversing magnetic field Hsw required for rewriting magnetization information in a recording layer constituting an MTJ is schematically expressed as follows:

$$Hsw \sim 4\pi Ms \times t/F (Oe) \tag{1}$$

In this connection, a magnetic anisotropic energy density Ku is schematically expressed as follows:

$$Ku = Hsw \cdot Ms/2 \tag{2}$$

Here, Ms represents saturated magnetization of a recording layer, t represents a thickness of the recording layer and F represents a width of the recording layer.

On the other hand, when the volume of the recording layer is represented as V, the thermal agitation resistance of the recording layer is represented as magnetic energy Ku×V. Accordingly, in an MTJ where an aspect ratio (length/width) of a recording layer is 2, the thermal agitation resistance is as follows:

$$Ku \times V = (Hsw \cdot Ms/2) \times V$$

$$= (4\pi Ms \times t/F) \times (Ms/2) \times F \times 2F \times t = 4\pi Ms^2 \times F$$

$$= Hsw^2 \times F^3 /(4\pi)$$

Accordingly, when the MTJ is made fine, namely, the width of the recording layer is made small, it is necessary to enlarge the reversing magnetic field Hsw in order to secure the thermal agitation resistance.

Since writing current of about 8 mA is required in a recording layer with a width of about 0.4 μm, the writing current further increases according to progress of fineness. It is necessary to reduce the writing current value to about 1.5 mA or less in order to perform writing at a high speed of about 10 nsec for mass storage, and it is preferable for reducing a peripheral circuit in size that the writing current value is set to about 0.5 mA.

Eleventh Embodiment

Figure 51A:
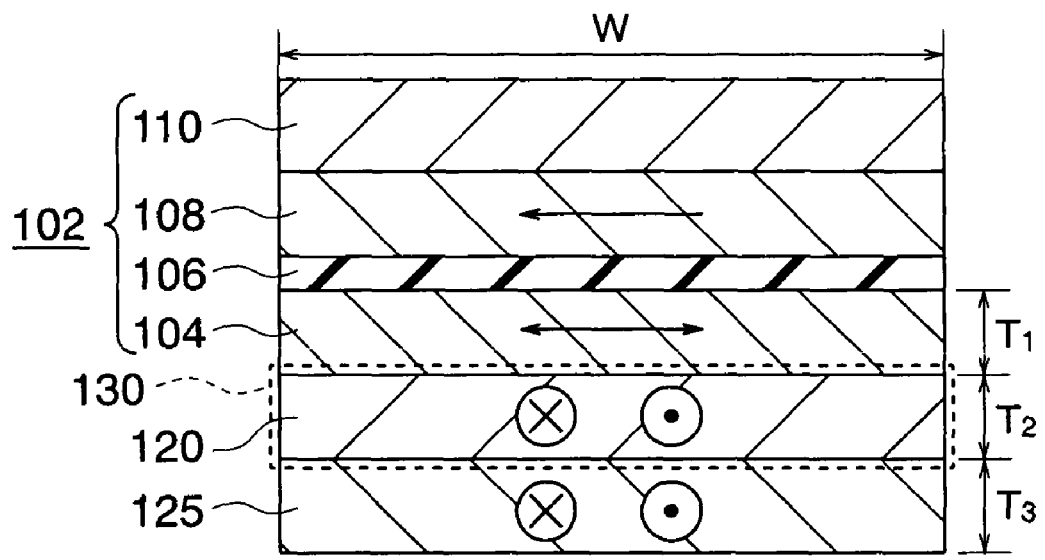
FIG. 51A is a sectional view showing a constitution of a memory cell in a magnetic memory according to an eleventh embodiment of the present invention.

A magnetic memory (hereinafter, also called MRAM (MagnetoResistive Random Access Memory) will be explained with reference to FIG. 51A. The magnetic memory according to the embodiment is provided with a plurality of memory cells. FIG. 51A is a sectional view showing a constitution of a memory cell in the magnetic memory of the embodiment. Each memory cell is provided with a tunnel junction element 102 (hereinafter, also called MTJ (magnetic tunneling junction). The MTJ 102 is provided with a magnetic recording layer 104 whose direction of magnetization varies according to external magnetic field, a tunnel barrier layer 106, a magnetization pinned layer 108 whose direction of magnetization is pinned, and an anti-ferromagnetic layer 110 which pines the direction of magnetization of the magnetization pinned layer 108. The magnetic recording layer 104 in the MTJ 102 is provided on a writing wire 120. The writing wire 120 is provided on a yoke 125 made of soft magnetic material which increases magnetic flux generated by current flowing in the writing wire 120.

That is, in the embodiment, a structure where the yoke 125, the writing wire 120, the magnetic recording layer 104, the tunnel barrier layer 106, the magnetization pinned layer 108, and the anti-ferromagnetic layer 110 are stacked is employed. Such a constitution is employed in the embodiment that end faces of the writing wire 120 and the yoke 125 (left and right end faces on FIG. 51A), and end faces of the magnetic recording layer 104, the tunnel barrier layer 106, the magnetization pinned layer 108, and the anti-ferromagnetic layer 110 (left and right end faces on FIG. 51A) are positioned on the same plane. That is, the yoke 125, the writing wire 120, the magnetic recording layer 104, the tunnel barrier layer 106, the magnetization pinned layer 108, and the anti-ferromagnetic layer 110 have the same width W. Incidentally, in the embodiment, the yoke 125, the writing wire 120, the magnetic recording layer 104, the tunnel barrier layer 106, the magnetization pinned layer 108, and the anti-ferromagnetic layer 110 are stacked in this order, but a structure the stacking order is reversed may be employed.

In the embodiment, material for the yoke 125 is selected so as to obtain the yoke 125 whose relative magnetic permeability is about 100 and whose direction of magnetization is generally parallel to or anti-parallel to writing current is selected. In the embodiment, the direction of magnetization of the magnetic recording layer 104 is generally perpendicular to writing current flowing in the writing wire 120.

In the embodiment, writing data in a memory cell is performed by causing writing current to flow in the writing wire 125 and a writing bit line (not shown) generally perpendicular to the writing wire 125 and reversing magnetization of the magnetic recording layer 104 in the MTJ with magnetic field generated by the current. Reading data from a memory cell is performed by applying a voltage between a reading-out wire (not shown) electrically connecting to the anti-ferromagnetic layer 110 and the writing wire 120 to measure current flowing in the MTJ 102 or by causing a constant current to flow between the reading-out wire and the writing wire to measure a voltage between the reading-out wire and the writing wire 120.

Though it is generally said that a current-magnetic field converting efficiency is made double and a writing current value is reduced to half by forming a yoke in a writing wire, this will be a limitation in such yoke formation. It is expected that a current value obtained when a yoke is formed in a writing wire and the width W of a MTJ is 240 nm is about 6 mA.

The magnitude of writing current in the embodiment will be explained below. As described above, in the embodiment, such a constitution is employed that the end faces of the yoke 125 and the writing wire 120 and the end face of the MTJ 102 are positioned on the same plane. When the film thickness sizes of the magnetic recording layer 104, the writing wire 120, and the yoke 125 are represented as $T_1$, $T_2$, and $T_3$, and the relative magnetic permeabilities of the magnetic recording layer 104, the writing wire 120, and the yoke 125 are represented as $\mu_1$, $\mu_2$ (=1), and $\mu_3$, an effective length Leff of a magnetic path of a magnetic closed circuit 130 shown with a broken line in FIG. 51A is expressed as follows:

$$\text{Leff} = 2 \times T2 + W/\mu 1 + W/\mu 3.$$

Here, under conditions of W=240 nm, $T_2$=20 nm, $\mu_1$=5, and $\mu_3$=100, since the magnetic path length (W/$\mu_3$) on the side of the yoke can be substantially disregarded, the effective magnetic length Leff of the magnetic closed circuit 130 will be 88 nm or so in this embodiment.

On the other hand, in an ordinary writing wire with a yoke, since end faces of the yoke and writing wire, and an end face of an MTJ are not positioned on the same plane, which is different from the embodiment, it is necessary to provide a margin of 50 nm for allowing an alignment error on both side faces. Further, since the writing wire and a magnetic recording layer of the MTJ are separated from each other in a distance of 50 nm or more by an insulating layer or the like, the effective magnetic path length will be 360 nm or more.

On the other hand, in the embodiment, since it is unnecessary to provide an alignment margin, and the magnetic path length can be disregarded, the effective magnetic path length Leff of the magnetic closed circuit 130 will be 88 nm or so. When identical writing currents are caused to flow in the memory cell in the embodiment and the ordinary writing wire with a yoke, respectively, magnetic fields generated in the respective memory cells are in inversely proportional to the magnetic path length.

Therefore, the magnitude of the magnetic field generated in the memory cell in the embodiment becomes 4.09 (=360/88) times the magnitude of the magnetic field generated in the memory cell having the ordinary writing wire with a yoke. That is, this means increase the current-magnetic field conversion efficiency up to 4.09 times. Further, this increase means that the writing current value can be reduced to 1/4.09=0.24. As a result, the writing current value in the memory cell of the embodiment can be reduced from 6 mA to 1.5 mA, as compared with the memory cell having the ordinary writing wire with a yoke.

Furthermore, when the film thickness $T_2$ of the writing wire 120 is 10 nm, the effective magnetic path length Leff becomes W/5+2×T2≈68 nm and it can be reduced. As compared with the memory cell having the ordinary writing wire with a yoke, the current-magnetic field conversion efficiency is increased up to 360/68 times so that the writing current value can be reduced to 68/360=0.19 times. That is, the writing current value is reduced to 1.1 mA.

In addition, when the relative magnetic permeability of the magnetic recording layer 104 in the MTJ 102 is 10, the effective magnetic path length can be reduced to about W/10+ 2×T2~44 nm, so that the writing current value becomes 0.73 mA. This value is very close to a target value of 0.5 mA of a writing current desirable for reducing a peripheral circuit of a magnetic memory.

A memory cell according to the embodiment was actually made on an experimental base so as to meet W=240 nm, $T_2$=10 nm, $\mu_1$=10, and 13=100 and was verified. The writing current value was about 1 mA. The value was very close to the target value (1 mA) desirable for realizing high speed writing of about 10 nsec or so.

Experiment about non-volatile of the memory cell made on an experimental base was made. The non-volatile was larger than one expected. It is estimated that this is because, even if magnetizations of the magnetic recording layer 104 in the MTJ 102 and the stacked yoke 125 are perpendicular to each other, they are coupled to each other. As a result, it was found that the thermal agitation resistance in this embodiment was remarkably improved as compared with the conventional MRAM. This was a completely unknown matter, which was first clarified in this experiment.

Considering the improvement of the thermal agitation resistance, it was found that the non-volatile could be secured, even if the reversing magnetic field of the magnetic recording layer 104 in the MTJ 102 was reduced to ⅕. As a result, the writing current value of the memory cell according to the embodiment was about ⅕ of 0.73 mA which is the writing current value calculated regarding the effective magnetic path length of about 44 nm, namely, 0.14 mA. Accordingly, significant reduction was achieved from the writing current of 6 mA in the memory cell having the ordinary writing wire with a yoke to 0.14 mA. 0.5 mA or less which was the target value desired for reducing the peripheral circuit for the magnetic memory in size could be achieved.

As the result of serious analysis on the above, it was found that such an effect or advantage that the writing current could be largely reduced was not inherent to the stacked yoke but was realized by setting the magnetization direction of the yoke 125 to the writing current to be generally parallel or anti-parallel (the relative magnetic permeability of the yoke 125 was a value of 100 or so) to each other and setting the relative magnetic permeability of the magnetic recording layer 104 in the MTJ 102 to 5 or more.

Figure 52:
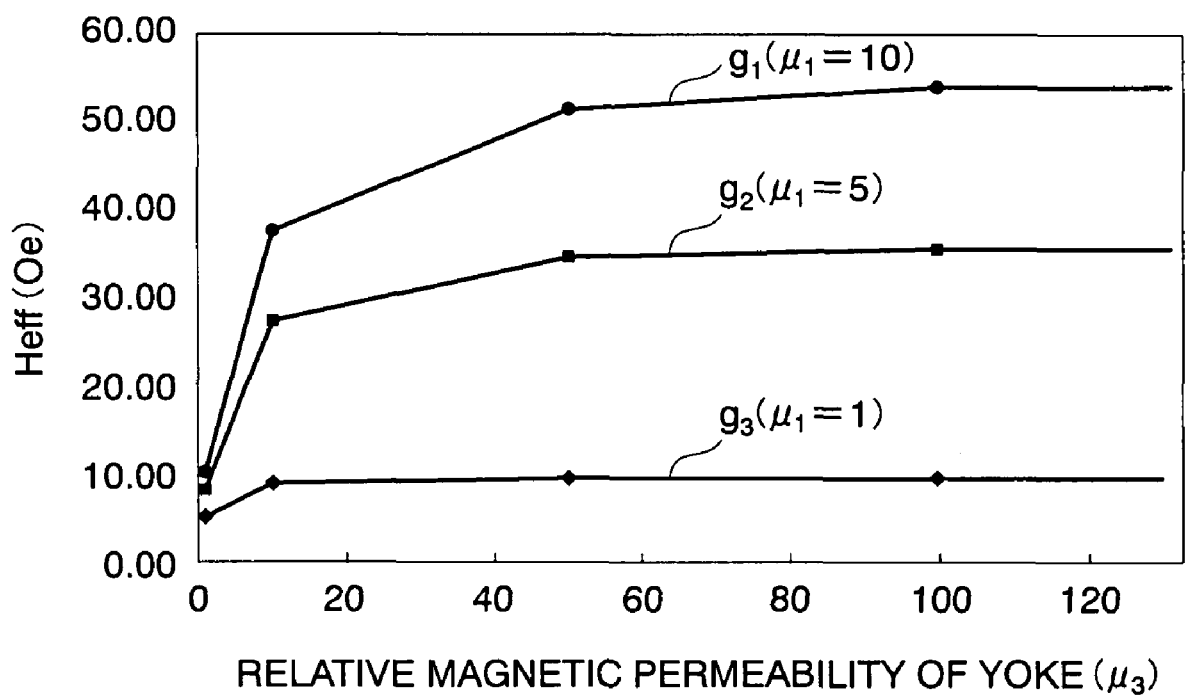
FIG. 52 is a characteristic graph showing an average generation magnetic field generated in a magnetism closing circuit to a relative magnetic permeability of a yoke when a relative magnetic permeability of a magnetic recording layer is used as a parameter in the eleventh embodiment.

In the memory cell according to the embodiment, average generation magnetic field Heff (Oe) generated in the magnetic closed circuit 130 shown in FIG. 51A when three kinds of memory cells having the relative magnetic permeability $\mu_1$ of the magnetic recording layer 104 in the MTJ 102 of 1, 5, and 10 were prepared and the relative magnetic permeability $\mu_3$ of the yoke 125 was changed to the respective memory cells is shown in FIG. 52. FIG. 52 is a characteristic diagram where a graph $g_1$ shows a case that the relative magnetic permeability $\mu_1$ of the magnetic recording layer 4 is 10, a graph $g_2$ shows a case that the relative magnetic permeability $\mu_1$ of the magnetic recording layer 4 is 5, and a graph $g_3$ shows a case that the relative magnetic permeability $\mu_1$ of the magnetic recording layer 4 is 1.

As understood from the characteristic diagram, the average generation magnetic field Heff is approximately constant, when the relative magnetic permeability $\mu_3$ takes a value in the vicinity of 100, for example, $\mu_3$ is in a range of 80 to 120. In that case, if the relative magnetic permeability of the magnetic recording layer 104 is 5 or more, the average generation magnetic field Heff becomes 35 Oe or more.

It is generally preferable for maintaining non-volatile of the magnetic recording layer 104 that the average generation magnetic field Heff is 30 Oe or more. As understood from FIG. 52, when the relative magnetic permeability $\mu_1$ of the magnetic recording layer 104 is 5 or more and the relative magnetic permeability $\mu_3$ of the yoke 125 is 30 or more, the average generation magnetic field Heff becomes 30 Oe or more, so that the non-volatile of the magnetic recording layer 104 can be maintained.

As explained above, according to the embodiment, since writing current can be reduced, high speed writing can be realized, and since the thermal agitation resistance is high, even if fineness is performed, the non-volatile can be secured. Thereby, mass storage and high speed writing can be achieved in this embodiment.

Twelfth Embodiment

Next, a magnetic memory according to a twelfth embodiment will be explained. The magnetic memory of the first embodiment has a constitution that electro-migration resistance of the writing wire 120 has been improved in the magnetic memory according to the eleventh embodiment.

Figure 51B:
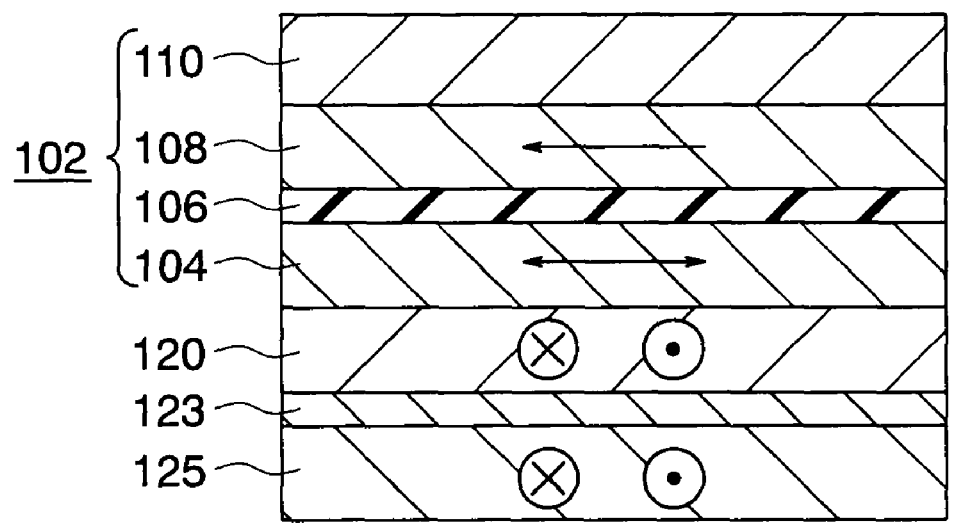
FIG. 51B is a sectional view of a constitution of a memory cell in a magnetic memory according to a twelfth embodiment of the present invention.

In the magnetic memory, the electro-migration of the writing wire 120 is a pending matter. When the width of the writing wire 120 is set to 240 nm and the thickness thereof is set to 20 nm for the writing current of 1 mA, the current density is $2 \times 10^7$ A/cm². The value is as large as 4 to 10 times of the allowable value applied when Cu is used for the material for the writing wire 120. Even if the writing current value can be set to 0.14 mA, the current density becomes $3 \times 10^7$ A/cm², which does not solve the above pending problem. In research through an experiment, it was found that there was a case that electro-migration did not occur even at a current density of $2 \times 10^7$ A/cm², which was different from the inventor's estimation. It was found that this phenomenon was specific to a case that, when the writing wire 120 made of Cu was thinned to about 30 nm or less, yoke material (NiFe, CoFe, CoZrNb) which was material with a high melting point was used in the yoke 125 serving as the base for the writing wire 120, a case that a metal layer 123 of Ta, Ti, or the like was disposed in an interface between the writing wire 120 and the yoke 125, as shown in FIG. 51B, and a case that an MTJ layer was directly disposed on an upper face of the writing wire 120 made of Cu.

In the embodiment, therefore, electro-migration can be prevented from occurring by thinning the film thickness of the writing wire 120 to 30 nm or less and using material with a high melting point as the material for the yoke 125. In this case, as shown in FIG. 51B, it is preferable that a metal layer 123 of Ta, Ti, or the like is provided in an interface between the writing wire 120 and the yoke 125.

This embodiment also allows mass storage and high speed writing like the eleventh embodiment.

Thirteenth Embodiment

Next, a magnetic memory according to a thirteenth embodiment of the present invention will be explained. The magnetic memory of the embodiment has a constitution that a writing selecting transistor is disposed for each memory cell in the eleventh or twelfth embodiment. The writing selecting transistor is electrically connected at one of its source and drain to the writing wire 120, and it serves as a word line for selection of a memory cell performed by a gate.

By providing a writing selecting transistor for each memory cell like this embodiment, a non-selected memory cell is prevented from being put in a semi-selected state. Therefore, the reversing magnetic field can be reduced to ½ or less of the reversing magnetic field where the improvement of the thermal agitation resistance is taken in consideration. Thereby, the writing current value can be reduced to ½ of the writing current of 0.14 mA where the improvement of the thermal agitation resistance is taken in consideration, namely, 0.1 mA or so. An erroneous action in writing is prevented and a very board margin for a writing circuit design can be secured.

This embodiment also allows mass storage and high speed writing like the eleventh embodiment.

By combining all the constitutions of the eleventh to thirteenth embodiments, a margin for the writing circuit could be enlarged, the peripheral circuit could be simplified and reduced in size, and the occupation ratio of the memory array could be reduced to 65% equivalent to that in an ordinary memory. Even if the width of the MTJ was further made fine to 100 nm or so, the writing current value could be reduced to 0.5 mA, and even if a writing transistor was added, the cell area could be reduced to 0.5 µm² or less. Thereby, a high speed and mass storage MRAM exceeding 64 Mbits can be provided.

Figure 53:
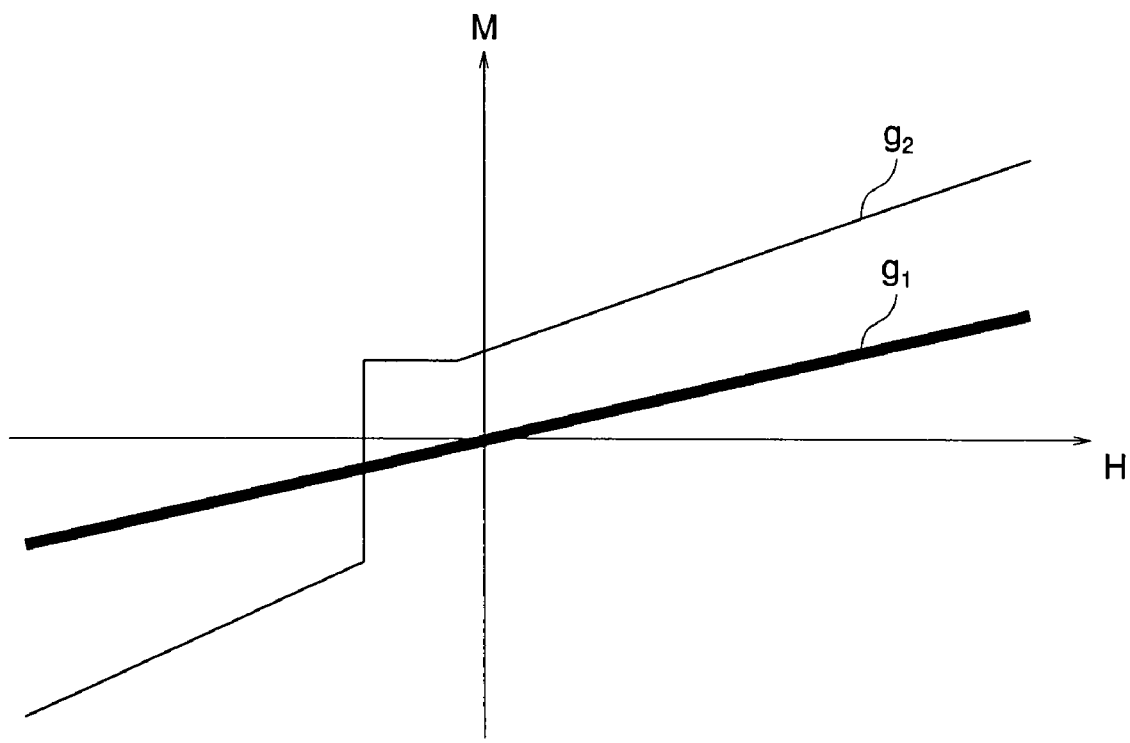
FIG. 53 is a graph showing change of magnetization of a magnetic recording layer to application of magnetic field.
Figure 54:
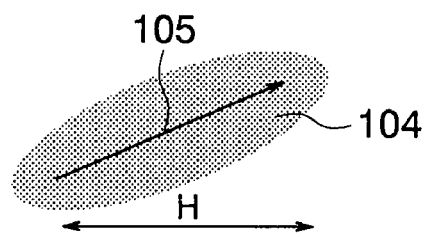
FIG. 54 is a diagram showing a relationship between an easy axis of magnetization of the magnetic recording layer according to one embodiment of the present invention and applied magnetic field.

It was found that a memory cell in which a writing current value was slightly high occurred in the MRAM made on a trial base. The result estimated from an experiment about a magnetization course of a magnetic recording layer of the memory cell is shown in FIG. 53. It was found that magnetization of an excellent memory cell in which a writing current value was low increased monotonously to any applied magnetic field H (refer to graph $g_1$), but a poor memory cell included a region where magnetization M of its magnetic recording layer did not react to a writing current to stagnate (refer to graph $g_2$).

Figure 55:
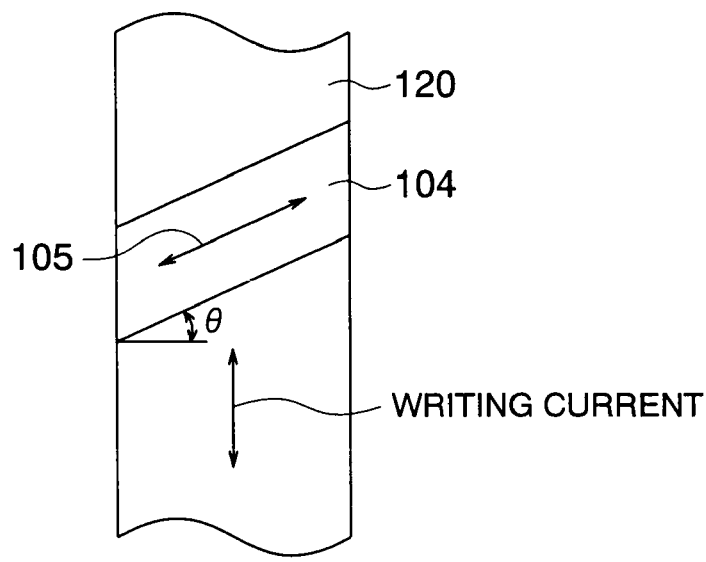
FIG. 55 is a plan view showing an arrangement of a magnetic recording layer and a writing wire according to one embodiment of the present invention.

It was found that it was effective for avoiding the stagnation of the magnetization M of the magnetic recording layer to the applied magnetic field H that the direction of magnetization (the easy magnetization axis) 105 of the magnetic recording layer 104 in the MTJ was not perpendicular to the applied magnetic field H but it was inclined thereto. Specifically, as shown in FIG. 55, it will be effective to employ such an arrangement that a long side direction (the easy magnetization axis 105) of the magnetic recording layer 104 is not perpendicular to a direction of a writing current flowing in the writing wire 120 (that is, a direction in which the writing wire 120 extends) but it is inclined thereto. It is preferable that the inclined angle θ is about 45°. FIG. 55 is a plan view of the magnetic recording layer 104 and the writing wire 120.

Figure 56A:
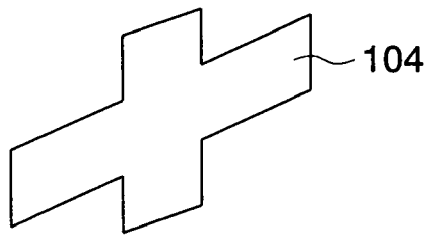
FIGS. 56A to 56D are views showing examples of a plan shape of a magnetic recording layer according to one embodiment of the present invention.
Figure 56B:
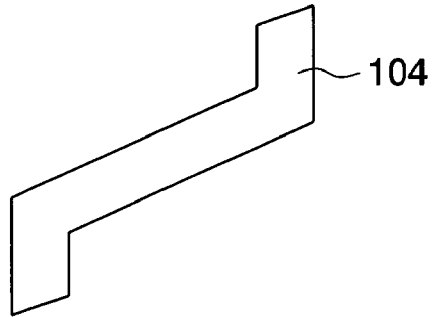
Figure 56C:
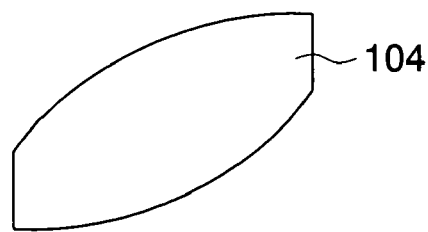
Figure 56D:
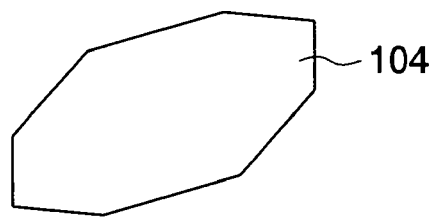

Similar advantage or merit could be achieved even if the MTJ 102 was formed in an almost cross shape, as shown in FIG. 56A, or even if the magnetic recording layer 104 was formed in an asymmetrical shape (for example, an S shape or an inverse S shape having projections at both ends) to an axis of the writing wire in its widthwise direction, as shown in FIG. 56B. As shown in FIGS. 56C and 56D, similar advantage could also be achieved in a shape of the magnetic recording layer 104 having the widest shape at a central portion in its longitudinal direction. FIG. 56C shows a shape obtained by cutting a rugby ball or an oval shape at its both ends, and FIG. 56D shows an octagonal shape.

First Example

Figure 57:
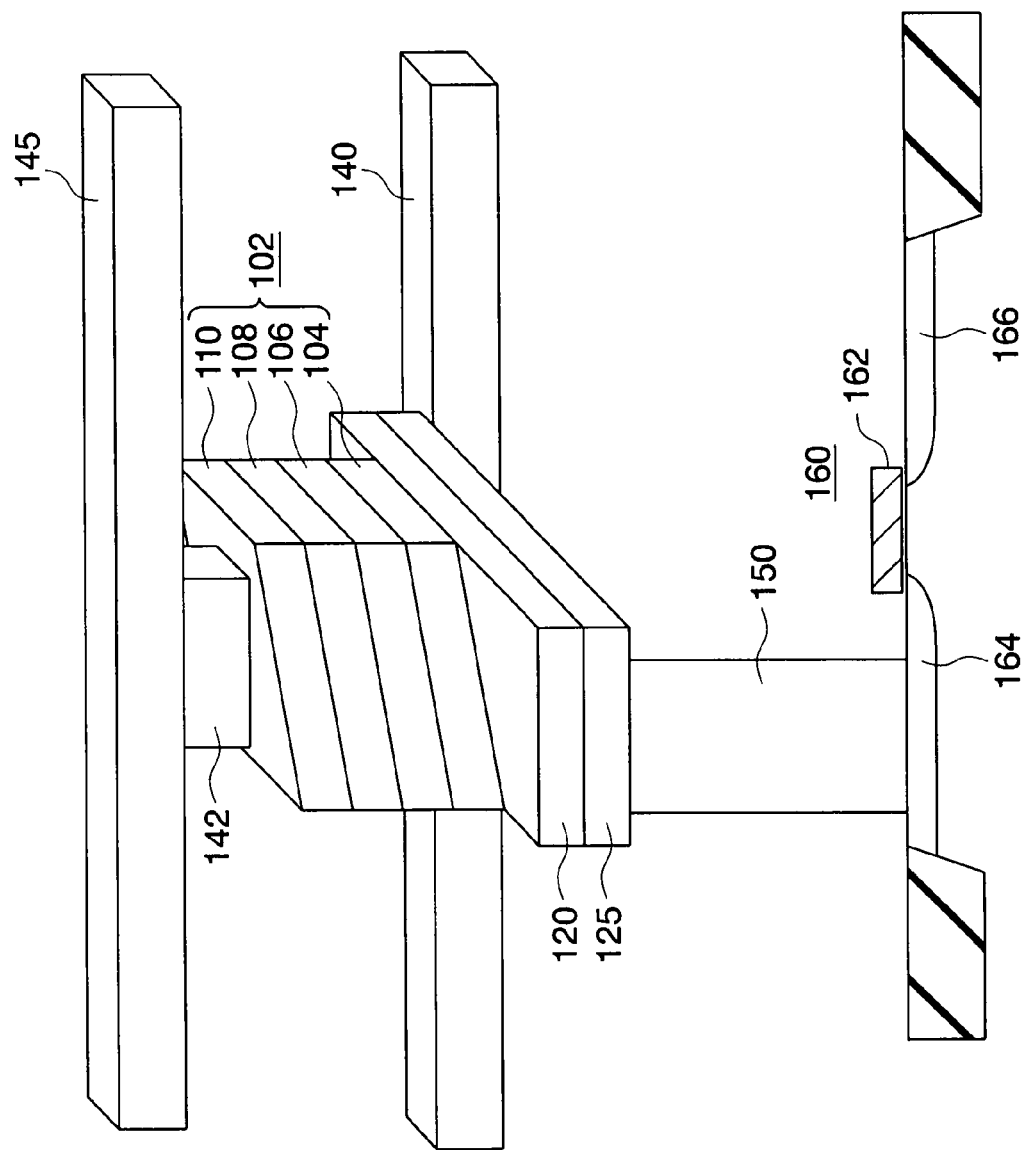
FIG. 57 is a diagram showing a constitution of the magnetic memory according to a first example of the present invention.

Next, a magnetic memory according to first example of the invention will be explained with reference to FIG. 57. FIG. 57 is a diagram showing a constitution of a memory cell in a magnetic memory according to this example. The magnetic memory of the example has a plurality of memory cells, and each memory cell is provided with an MTJ 102, a writing wire 120, a yoke 125, and a writing selecting transistor 160.

The MTJ 102 is provided with a magnetic recording layer 104 provided on the writing wire 120, a tunnel barrier layer 106 provided on the magnetic recording layer 104, a magnetization pinned layer 108 provided on the tunnel barrier layer 106, and an anti-ferromagnetic layer 110 provided on the magnetization pinned layer 108. The yoke 125 is provided so as to come in contact with the opposite face of the writing wire 120 from the magnetic recording layer 104. The writing selecting transistor 160 is provided with a gate 162 which also serves as a word line, a source 164, and a drain 166. The writing wire 120 is electrically connected to the source 164 of the writing selecting transistor 160 via the yoke 125 and a connecting portion 150.

A writing bit line 140 is provided on the opposite side of the writing wire 120 from the yoke 125 so as to be approximately perpendicular to the writing wire 120 via an insulating layer (not shown). The writing bit line 140 is provided just below the MTJ 102. The anti-ferromagnetic layer 110 in the MTJ 102 is electrically connected to a reading bit line 145 via a connecting portion 142.

In the example, such a constitution is employed like the first embodiment that end faces of the writing wire 120 and the yoke 125 in a direction perpendicular to current flowing in the writing wire 120, and end faces of the magnetic recording layer 104, the tunnel barrier layer 106, the magnetization pinned layer 108, and the anti-ferromagnetic layer 110 are positioned on the same plane. The magnetic recording layer 104 in the MTJ 102 is arranged to appear in a plan view such that a long side direction of the magnetic recording layer 104 is not perpendicular to a direction of the writing current flowing the writing wire 120 but it is inclined thereto, as explained regarding FIG. 55.

In the magnetic memory of the example thus constituted, writing of data in a memory cell is performed by first turning on the writing selecting transistor 160, thereafter causing writing current to flow the writing wire 120 and the writing bit line 140 to generate writing magnetic field, and reversing magnetic field of the magnetic recording layer 104 by the writing magnetic field.

Reading of data from the memory cell is performed by first turning on the writing selecting transistor 160, thereafter applying a voltage between the reading bit line 145 and the drain 166 of the writing selecting transistor 160, and measuring current flowing the MTJ 102, or by supplying fixed current one of the reading bit line 145 and the drain 166 of the writing selecting transistor 160 to the MTJ 102 and measuring a voltage between the reading bit line 145 and the drain 166 of the writing selecting transistor 160.

The magnetic memory according to the example also allows mass storage and high speed writing, of course.

Second Example

Next, a second example of the invention will be explained with reference to FIGS. 58(a), 58(b), and 58(c). This example is directed to a method for manufacturing the memory cell in the magnetic memory according to the first example shown in FIG. 57, and manufacturing steps are shown in FIGS. 58(a), 58(b), and 58(c).

Figure 58:
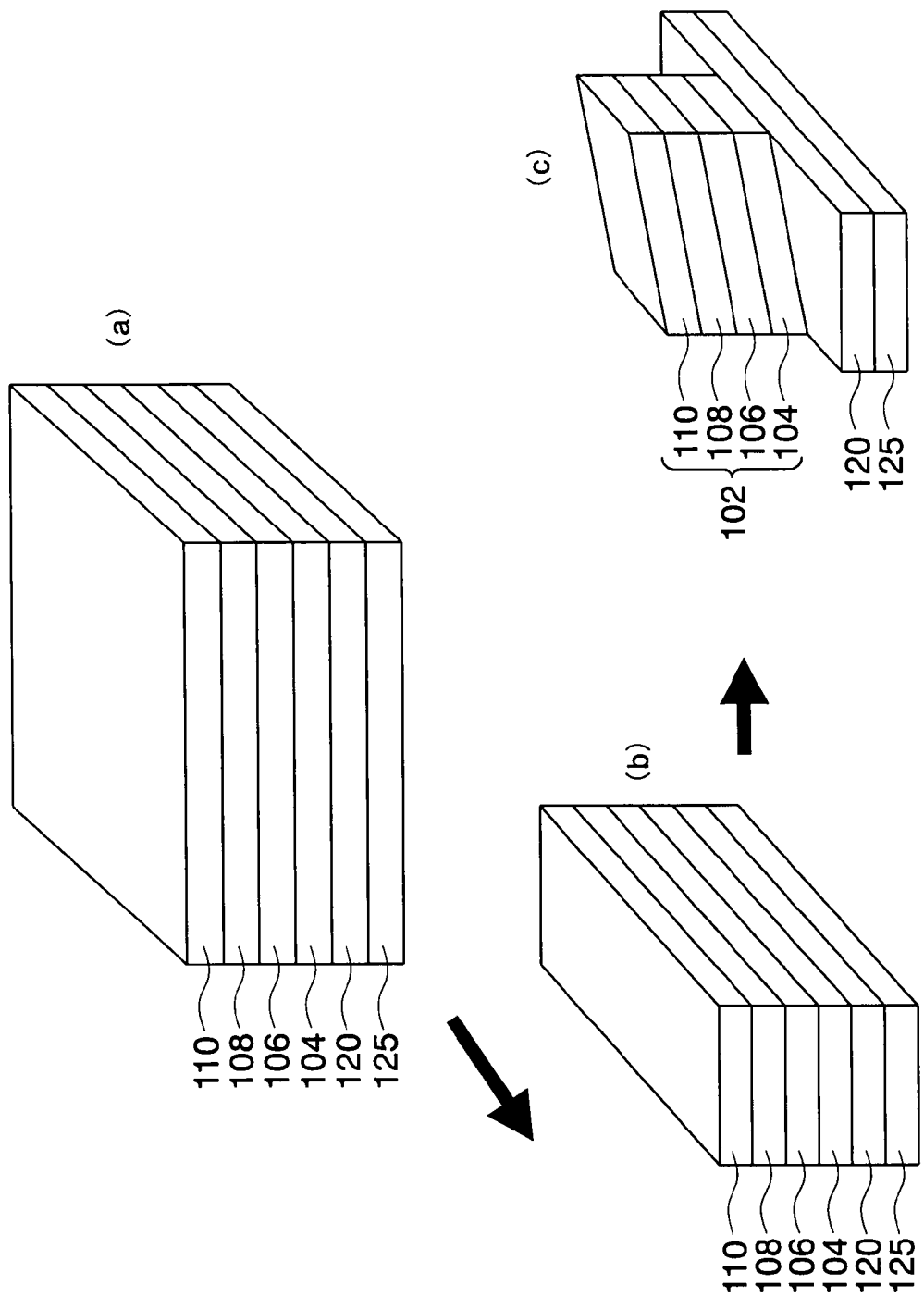
FIGS. 58(*a*), 58(*b*), and 58(*c*) are perspective views showing manufacturing steps in a method for manufacturing the magnetic memory according to a second example of the present invention.

As shown in FIG. 58(a), first, the yoke 125, the writing wire 120, the magnetic recording layer 104, the tunnel barrier layer 106, the magnetization pinned layer 8, and the anti-ferromagnetic layer 110 are sequentially stacked on a substrate (not shown). The yoke 125 is made of NiFe or CoZrNb in an amorphous state, the writing wire 120 is made of Ru, Cu, or CuNx, the magnetic recording layer 104 is made of NiFe, the tunnel barrier layer 106 is made of AlOx, the magnetic recording layer 108 is made of CoFe, and the anti-ferromagnetic layer 110 is made of PtMn.

Next, the stacked layers of the yoke 125, the writing wire 120, the magnetic recording layer 104, the tunnel barrier layer 106, the magnetic fixing layer 108, and the anti-ferromagnetic layer 110 are patterned so as be formed in a wiring shape by utilizing a lithography technique (refer to FIG. 58(b)).

Next, the BTJ 102 is formed on the writing wire 120 by patterning the magnetic recording layer 104, the tunnel barrier layer 110, the magnetic fixing layer 108, and the anti-ferromagnetic layer 110 (refer to FIG. 58(c)).

The magnetic memory manufactured by the manufacturing method of this example is constituted like the first embodiment such that end faces of the writing wire 120 and the yoke 125 in a direction perpendicular to current flowing the writing wire 120, and end faces of the magnetic recording layer 104, the tunnel barrier layer 106, the magnetization pinned layer 108, and the anti-ferromagnetic layer 110 are positioned on the same plane. The magnetic recording layer 104 of the MIT 102 is arranged to appear in a plan view such that a long side direction of the magnetic recording layer 104 is not perpendicular to a direction of the writing current flowing the writing wire 120 but it is inclined thereto, as explained regarding FIG. 55.

Accordingly, the magnetic memory manufactured by the manufacturing method according to this example also allow mass storage and high speed writing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A magnetic memory which has memory cells, each of the memory cells comprising:
    a storage element comprising a magnetic recording layer whose magnetization direction changes according to an external magnetic field, a magnetization pinned layer whose magnetization direction is pinned, and a nonmagnetic layer provided between the magnetic recording layer and the magnetization pinned layer;
    a writing wire which is provided on the magnetic recording layer on a side opposite to a side on which the nonmagnetic layer is disposed, and in which writing current flows; and
    a yoke which is provided on the writing wire only on a side opposite to a side on which the magnetic recording layer is disposed, and which is provided along a first direction in which the writing wire extends, and the yoke comprising a planar shape different from a planar shape of the magnetic recording layer,
    a longitudinal axis of the magnetic recording layer being inclined to a second direction perpendicular to the first direction by an angle of more than 0° and less than 90°,
    the planar shape of the magnetic recording layer has a maximum width in the first direction positioned at a central portion of the magnetic recording layer in the second direction, and the planar shape of the magnetic recording layer includes a pair of opposed sides along the longitudinal axis of the magnetic recording layer, each entirety of the pair of the opposed sides being a curved line,
    a pair of side faces along the first direction of the storage element being positioned on the same plane as a pair of opposed side faces of each of the writing wire and the yoke, and
    the magnetic recording layer being electrically connected to the writing wire.

2. A magnetic memory according to claim 1, wherein the longitudinal axis of the magnetic recording layer is inclined to the second direction by an angle of 45°.

3. A magnetic memory according to claim 1, wherein the planar shape of the magnetic recording layer is asymmetrical regarding the second direction.

4. A magnetic memory according to claim 1, wherein a relative magnetic permeability of the magnetic recording layer is 5 or more, and a relative magnetic permeability of the yoke is in a range of 80 or more and 120 or less.

5. A magnetic memory according to claim 1, wherein the yoke is formed of at least one material selected from the group consisting of NiFe, CoFe, and CoZrNb.

6. A magnetic memory according to claim 1, wherein each of the memory cell are provided with a selecting transistor which selects the memory cell, and one end of the storage element is electrically connected to the selecting transistor.

7. A magnetic memory according to claim 1, wherein
    a metal layer is provided between the writing wire and the yoke.

* * * * *